(12) United States Patent
Aguiar et al.

(10) Patent No.: US 11,290,772 B2
(45) Date of Patent: Mar. 29, 2022

(54) MULTI-SOURCE CONTENT DISPLAYING INTERFACE

(71) Applicant: KYNDRYL, INC., New York, NY (US)

(72) Inventors: Danne Meira Castro Aguiar, Indaiatuba (BR); Igor Monteiro Vieira, Hortolandia (BR); Tiago Dias Generoso, Poços de Caldas (BR); Francis D. M. Ricalde, Porto Alegre (BR)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/785,864

(22) Filed: Feb. 10, 2020

(65) Prior Publication Data
US 2021/0250641 A1   Aug. 12, 2021

(51) Int. Cl.
*H04N 21/41*    (2011.01)
*H04N 21/422*   (2011.01)
(Continued)

(52) U.S. Cl.
CPC ....... *H04N 21/4312* (2013.01); *G06V 40/172* (2022.01); *H04N 21/235* (2013.01);
(Continued)

(58) Field of Classification Search
CPC .......................... H04N 13/0447; G09G 3/003
See application file for complete search history.

(56) References Cited

U.S. PATENT DOCUMENTS 6,188,442 B1   2/2001  Narayanaswami
6,986,154 B1   1/2006  Price
(Continued)

FOREIGN PATENT DOCUMENTS

CN   102547329 A   7/2012
CN   103947200 A   7/2014
CN   109256136 A   1/2019

OTHER PUBLICATIONS

"EyeTech multi-user eye tracking TV display", YouTube, Jan. 13, 2015, 1 page, <https://www.youtube.com/watch?v=908ggeL4tb4&feature=youtu.be>.
(Continued)

*Primary Examiner* — Hsiungfei Peng
(74) *Attorney, Agent, or Firm* — Schmeiser, Olsen & Watts, LLP; Ken Han

(57) ABSTRACT

Computer-implemented methods, systems and computer program products leveraging wireless communication networks to deliver content from a plurality of content sources to multiple users viewing different content on the same display device. Receiving devices connect to the display device and allow simultaneous and independent content viewing by establishing a connection to the display device, selecting the content to view from the plurality of content sources available and wirelessly transmitting audio and video frames of the selected content at a particular frequency to the receiving device tuned into the frequency of the process ID broadcasting the selected content. For example, smart glasses, AR devices or VR headsets. As the user views the display device through the receiving device, different users experience the different selected content overlaid or emulated onto the same display device without interfering or being able to view content simultaneously displayed to other users of the display device.

20 Claims, 11 Drawing Sheets

(51) Int. Cl.

| | |
|---|---|
| *H04N 21/4223* | (2011.01) |
| *H04N 21/436* | (2011.01) |
| *H04N 21/4363* | (2011.01) |
| *H04N 21/482* | (2011.01) |
| *H04N 21/431* | (2011.01) |
| *H04N 21/235* | (2011.01) |
| *H04N 21/45* | (2011.01) |
| *H04N 21/4415* | (2011.01) |
| *H04N 21/4147* | (2011.01) |
| *H04N 21/61* | (2011.01) |
| *G06V 40/16* | (2022.01) |

(52) U.S. Cl.
CPC ... *H04N 21/4147* (2013.01); *H04N 21/43637* (2013.01); *H04N 21/4415* (2013.01); *H04N 21/4532* (2013.01); *H04N 21/6131* (2013.01)

(56) References Cited

U.S. PATENT DOCUMENTS

| | | | | |
|---|---|---|---|---|
| 8,325,223 | B2 | 12/2012 | Ko | |
| 9,191,656 | B2 | 11/2015 | Kim | |
| 9,693,046 | B2* | 6/2017 | Unkel | H04N 13/356 |
| 2007/0263003 | A1 | 11/2007 | Ko | |
| 2008/0165176 | A1 | 7/2008 | Archer | |
| 2010/0079676 | A1 | 4/2010 | Kritt | |
| 2014/0347265 | A1* | 11/2014 | Aimone | A61M 21/00 |
| | | | | 345/156 |
| 2017/0195666 | A1 | 7/2017 | Konakalla | |
| 2017/0310955 | A1 | 10/2017 | Keys | |
| 2019/0058341 | A1* | 2/2019 | Gou | H04W 52/0261 |
| 2019/0244639 | A1* | 8/2019 | Benedetto | G11B 27/036 |
| 2019/0361230 | A1* | 11/2019 | Chung | H04N 13/332 |
| 2020/0320955 | A1* | 10/2020 | Kiser | G02B 27/0176 |

OTHER PUBLICATIONS

"IBM Edge Computing", IBM, last printed Jan. 15, 2020, 4 pages, <https://www.ibm.com/cloud/edge-computing>.

"LG webOS—Multi-View", YouTube, Dec. 20, 2016, 1 page, <https://www.youtube.com/watch?v=yHfFGMHzEX4&app=desktop>.

High, Rob, IBM Edge Computing, IBM Cloud, © Copyright IBM Corporation 2019, 6 pages, <https://www.ibm.com/downloads/cas/O8YVJY9Z>.

LG AI TVs with the Google Assistant Built-In: Commands, LG USA, last printed Jan. 15, 2020, 4 pages, <about:reader?url=https://www.lg.com/us/experience-tvs/ai-tvs/google-assistant>.

Mell et al., "The NIST Definition of Cloud Computing", National Institute of Standards and Technology, Special Publication 800-145, Sep. 2011, 7 pages.

International Search Report and Written Opinion, International Application No. PCT/IB2021/050910, International Filing Date Feb. 4, 2021.

* cited by examiner

MULTI-SOURCE CONTENT DISPLAYING INTERFACE

TECHNICAL FIELD

The present disclosure relates generally to the field of managing display devices and more specifically to managing wireless transmission and display from multiple content sources over a network.

BACKGROUND

Display devices, such as monitors, televisions, touch screens or other existing display technologies are capable of presenting visual and/or audio content to viewers. For example, displaying a movie, television show, web page, application, video game, etc. In most cases, a single source of content may be displayed. However, in some instances, a collage of content from multiple sources may be managed and displayed by the display device (i.e. displaying multiple windows of content that are running and viewable). Some display devices may switch between content by switching the content source through the inputs of the display device's hardware, while other display devices may split the screen or employ picture-in-picture to display content from multiple sources. While multiple sources may be displayed or accessed by a single display device, the displayed content presented by the display device technology is uniformly presented as the same output for all viewers of the display device. The restrictive nature of the existing display devices inhibit personalized displayed content to each user and limits simultaneous viewers of the content to viewing the exact same output of the display device. Simultaneous viewers of the display device are unable to observe a different output from other viewers viewing the display device at the same time.

Currently available display devices are incapable of simultaneously displaying different content outputs to users viewing the display device or allow users to selectively control which source of content to view independently of other viewers simultaneously viewing and/or controlling the output of the display device. To overcome the output limitations of current display devices and allow a single display device to independently display multiple sources of content simultaneously on the same display device, there is a need for a solution that allow users to selectively control, view and/or listen to content sources in a personalized manner that does not cause interference or overlap between the content sources or streams being viewed by other simultaneous users. Embodiments of the present disclosure described herein, overcome the limitations of existing display devices, and allow for a plurality of simultaneous viewers to personalize the viewable outputs of the same display device by combining advances in wireless network communications with virtual reality, augmented reality and/ or mixed reality to individualize the content experienced by each user. As a result, users are able to independently view output of content from different audio and/or visual content sources in a manner that allows different content sources to be experienced on the same display device at the same time without interference or overlapping between the content selections made by different viewers.

SUMMARY

Embodiments of the present disclosure relate to a computer-implemented method, an associated computer system and computer program product for independently viewing different content sources by a plurality of users on a same display device simultaneously. The computer-implemented method comprising detecting, by a processor, a presence of a first user, presenting to the first user, by the processor, a plurality of content sources available for selection; assigning, by the processor, a process ID to each content source of the plurality of content sources available for selection; receiving, by the processor, a selection of a first content source by the first user; saving, by the processor, audio and/or video frames of the first content source to memory allocated to a first process ID; assigning, by the processor, a first transmission frequency to the first process ID; transmitting, by the processor, the first process ID at the first transmission frequency to a first receiver device; and displaying, by the processor, the audio and/or video frames of the first process ID on a display device when viewed through the first receiving device.

The computer-implemented method, associated system and computer programming device, further comprise: detecting, by the processor, a presence of a second user; presenting to the second user, by the processor, the plurality of content sources available for selection; receiving, by the processor, a selection of a second content source by the second user; saving, by the processor, audio and/or video frames of the second content source to memory allocated to a second process ID; assigning, by the processor, a second transmission frequency to the second process ID, wherein the second transmission frequency is different from the first transmission frequency; transmitting, by the processor, the second process ID at the second transmission frequency to a second receiver device; and displaying, by the processor, the audio and/or video frames of the second process ID on the display device, when viewed through the second receiving device.

The aspects of the computer-implemented method, the associated computer system and computer program product, offer advantages over existing display technologies because the disclosed embodiments allows multiple detected users to independently select and access content streams through an A/V receiver and display the selected content on the same display device simultaneously, while at the same time, limiting the content viewed or heard from other users' selected content. Each user can select and view different content for display on the same display device in a single location, without seeing or hearing content selected and viewed by surrounding users. Moreover, by assigning different frequencies to the frequency connections between the process IDs storing and presenting the content to the A/V receivers, the content associated with the process IDs can transmit different content to users based on the user selection, without the transmissions of the content interfering with one another or being viewable to other A/V receivers that are not tuned into the particular frequency for viewing the content transmission.

Additional aspects of the present disclosure further include integration of recording devices such as biometric cameras and sensor devices for identifying users within view of the display device and differentiating users from one another. The use of biometrics and sensors as integrated or standalone components of the display device allow for the method, system and computer program products to accurately identify users who may enter or exit the surrounding area of the display device, and load customized profiles associated with each user as the users are identified within the vicinity of the display device. By identifying individuals, the display device provides advantages of offering users customized preferences, content sources, settings, advertising, viewing options and listening options that can be maintained as the user moves from one display device to another, without impeding or affecting the preferences of another user who may be simultaneously viewing the same display device or even the same content source.

Another aspect of the present disclosure includes transmission of the content associated with the process IDs using 5G wireless network connection or Wi-Fi 6 wireless connection. Advantages of the 5G or Wi-Fi 6 wireless connection over previously existing types of network connections may be due to the capability of the 5G or Wi-Fi 6 to carry large amounts of data at high speeds and allow for transmission over a larger area of coverage than previously existing wireless network connections. In particular 5G wireless transmission can operate using a high frequency bandwidth between 30-300 GHz, known as millimeter waves, which can offer high data transmission throughputs over wireless transmissions and wide coverage areas. Implementing content delivery of the present disclosure using a 5G network can offer the advantage of deploying the digital multi-screen engine as a lightweight, cloud-native application or network-orchestrated microservice and perform transmission of the content over the wireless network on demand, rather than deploying entire applications or remote application programming interfaces (API) on the display device and/or A/V receivers.

BRIEF DESCRIPTION OF THE DRAWINGS

FIG. 7b is a continuation of the method steps describing the embodiment of the method from FIG. 7a.

DETAILED DESCRIPTION

Figure 1:
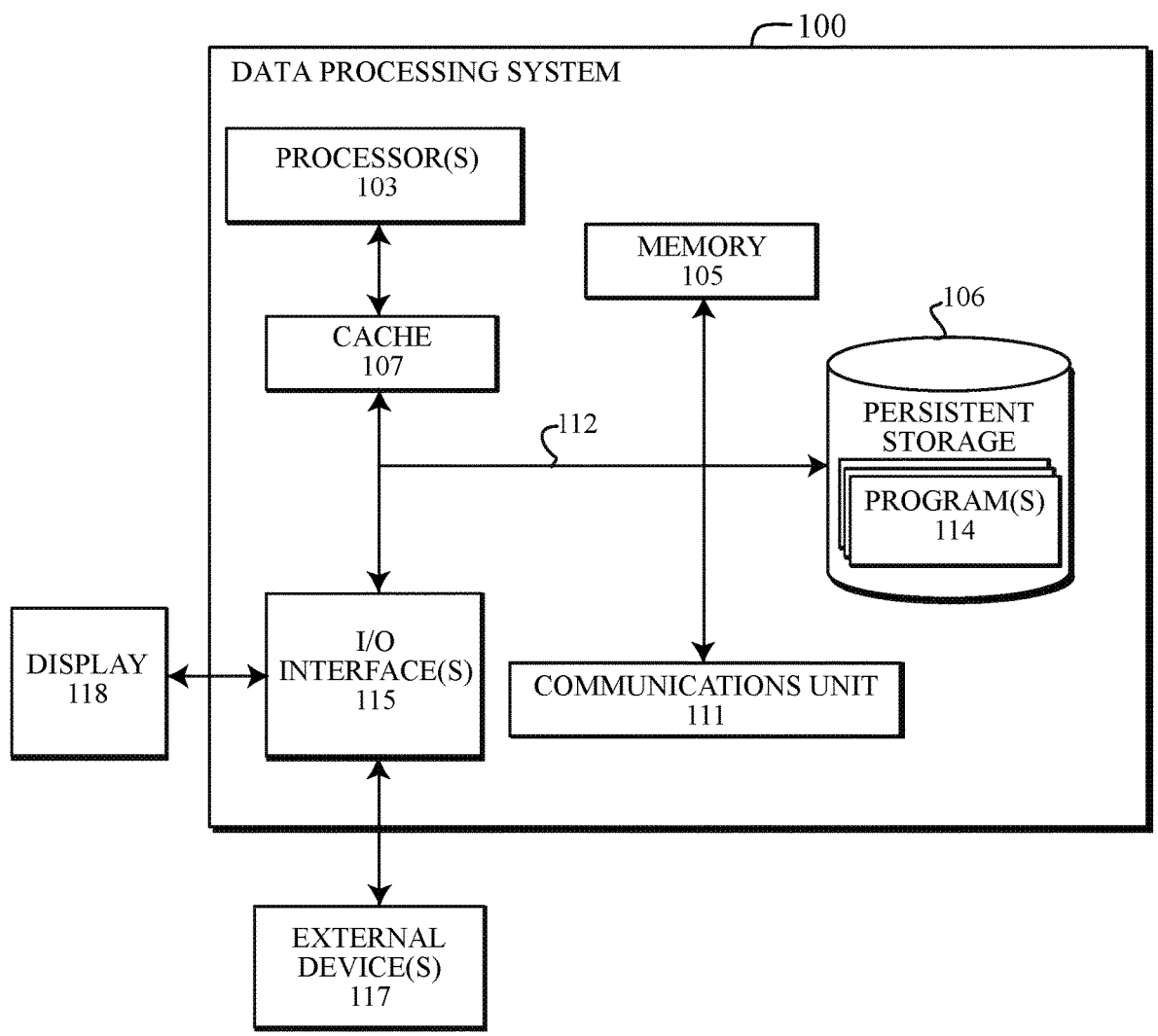
FIG. 1 depicts an embodiment of a block diagram of internal and external components of a data processing system, in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Currently available display devices 118 such as televisions, monitors and screens, are limited to displaying a single content source 209 at a time. The output from a content source 209 is displayed to all surrounding viewers, who see the same visual information on the display device 118. For example, displaying a single video, television show, video game, etc. on the display device 118 at a time. While some display devices 118 may have multiple inputs that can be switched by the display device 118, viewers of the display device each see the same visual information being displayed as the display device 118 switches between inputs. Moreover, in instances where current technology is able to display multiple content sources 209 simultaneously, viewers of the display device 118 each see the same visual information being depicted. Whether the plurality of content sources 209 are shown in a split-screen orientation or multiple windows positioned within the display area of a display device, the collage of multiple content sources 209 is viewed identically on the display device 118 by the viewers within the viewing area.

Embodiments of the present disclosure recognize the inability of currently available display device 118 technologies to individualize and customize the delivery of content to viewers of a display device 118 when multiple content sources 209 are connected to the display device 118. Embodiments of the present disclosure improve the existing display device 118 technologies by permitting multiple users to selectively view different content sources 209 on the same display device 118, simultaneously, without the simultaneous display of content sources 209 being visible to surrounding viewers who have not chosen to view one or more content sources 209 being transmitted for display. For example, two users viewing the same television screen, can each watch and listen to a different television program or movie, at the exact same time, without the first user seeing or hearing the content of the second user's movie or television program. By allowing multiple user's to simultaneously view a plurality of content sources 209 on the same display device 118, independently of the other surrounding users, there is a reduced need for having multiple display devices 118 in the same space or area, visual and/or audio noise pollution caused by unwanted display devices 118 can be reduced or eliminated and users can customize viewing or listening experience based on each user's preferences while still congregating with other users in the same physical space.

Embodiments of the present disclosure are able to provide multiple users with content from multiple content sources 209 through a single display device 118 by leveraging wireless communication networks 250 and the use of augmented reality and/or virtual reality. Augmented reality (AR) may refer to technology that superimposes a computer generated image on a user's view of the real world, thus providing a composite view of both physical space and virtual space. An AR display or AR device 259 is a device used to display AR to a user. Virtual reality (VR) may be a three-dimensional computer-generated environment that is immersive to the user. A user becomes part of the virtual world or may operate as an avatar within the environment, and thus able to operate objects and perform a number of programmable activities within the virtual environment. Embodiments of the present disclosure are able to segregate content sources 209 into separate and distinct processes, each with an assigned process ID. The processes associated with each content source 209 may run in the background of a display device 118 while the audio and/or video frames of the content source 209 are stored to memory (real or virtual) allocated to a particular process ID assigned to the content source 209. The audio/video (A/V) receiving devices 207, for example, smart glasses 255, augmented reality devices 259 and/or virtual reality headsets 257 can be tuned to a particular frequency 503 or frequency band to receive transmission of a content source's stored frames of a selected process ID. As the user views the transmitted frames (extracted from the content source 209 and stored to memory allocated to the process ID) through the receiving device 207, the frames may be overlaid onto the display device 118 in some embodiments, for instance using augmented reality when using an AR device 259 or smart glasses 255, and may be projected within a virtual environment while a user is using a virtual reality headset 257.

Embodiments of the present disclosure may isolate the delivery of audio and visual frames to the A/V receivers 207 worn by users selecting to receive the particular content sources 209 by establishing a frequency connection between display device 118 and the A/V receiver 207 over a wireless network. Process IDs may be assigned different frequencies for transmission that do not overlap. Therefore, when different process IDs assigned different content sources 209 are selected by users, the transmission of the frames are delivered to the designated A/V receivers 207 tuned to the frequency of the process ID selected, ensuring that A/V receiver 207 only receive the audio and/or video frames associated with the selected process ID without receiving interference from other process IDs being delivered to other A/V receivers 207 at a different frequency.

Embodiments of the present disclosure further recognize that a viewing audience of a display device 118 may be dynamic throughout the use of the display device 118. A plurality of users may both enter and leave a viewing area of a display device 118 throughout the transmission of content by the display device 118 to users engaging with the display device 118. Recording devices 206, such as cameras equipped with imaging and facial recognition software and/or sensor devices 204 capable of recording biometric data, may identify users entering or leaving the vicinity of the display device 118. As users enter the area surrounding the display device 118, the user may be identified by a recording device 206 or sensor device 204. For example, by facially recognizing a registered user or the user inputting a fingerprint or other biometrically identifying data. New users may also sign in through an interface which may be displayed through an unused A/V receiver 207 connected to the display device 118 or host system 203 managing content delivery sent to the display device 118. Once signed in, existing user profiles 228, along with user preferences and settings 223 may be loaded from an existing user database 221. The signed-in user can select a content source 209 to view from a list of available content sources. At the end of the user's viewing session, the user can log out of the A/V receiver 207 and/or may leave the surrounding viewing area of the display device 118.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 100, which may be a simplified example of a computing system capable of performing one or more computing operations described herein. Data processing system 100 may be representative of the one or more computing systems or devices depicted in the computing environment 200, 220, 300 as shown in FIGS. 2*a*-6, and in accordance with the embodiments of the present disclosure described herein. It should be appreciated that FIG. 1 provides only an illustration of one implementation of a data processing system 100 and does not imply any limitations with regard to the environments in which different embodiments may be implemented. In general, the components illustrated in FIG. 1 may be representative of any electronic device capable of executing machine-readable program instructions.

While FIG. 1 shows one example of a data processing system 100, a data processing system 100 may take many different forms, both real and virtualized. For example, data processing system 100 can take the form of personal desktop computer systems, laptops, notebooks, tablets, servers, client systems, network devices, network terminals, thin clients, thick clients, kiosks, mobile communication devices (e.g., smartphones), augmented reality (AR) devices 259, virtual reality (VR) headsets 257, multiprocessor systems, microprocessor-based systems, minicomputer systems, mainframe computer systems, smart devices (i.e. smart glasses 255, smart watches, etc.), or Internet-of-Things (IoT) devices. The data processing systems 100 can operate in a networked computing environment, containerized computing environment, a distributed cloud computing environment, a serverless computing environment, and/or a combination of environments thereof, which can include any of the systems or devices described herein and/or additional computing devices or systems known or used by a person of ordinary skill in the art.

Data processing system 100 may include communications fabric 112, which can provide for electronic communications between one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103, memory 105, cache 107, external devices 117, and any other hardware components within a data processing system 100. For example, communications fabric 112 can be implemented as one or more buses.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Software program(s) 114, applications, and services described herein, may be stored in memory 105, cache 107 and/or persistent storage 106 for execution and/or access by one or more of the respective processor(s) 103 of the data processing system 100.

Persistent storage 106 may include a plurality of magnetic hard disk drives. Alternatively, or in addition to magnetic hard disk drives, persistent storage 106 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between data processing systems 100. For example, between one or more computer systems or devices via a communication network. In the exemplary embodiment, communications unit 111 may include network adapters or interfaces such as a TCP/IP adapter cards, wireless Wi-Fi interface cards or antenna, 3G, 4G, or 5G cellular network interface cards or other wired or wireless communication links. Communication networks can comprise, for example, copper wires, optical fibers, wireless transmission, routers, firewalls, switches, gateway computers, edge servers and/or other network hardware which may be part of, or connect to, nodes of the communication networks' devices, systems, hosts, terminals or other network computer systems. Software and data used to practice embodiments of the present invention can be downloaded to the computer systems operating in a network environment through communications unit 111 (e.g., via the Internet, a local area network or other wide area networks). From communications unit 111, the software and the data 211 of program(s) 114, applications or services can be loaded into persistent storage 106 or stored within memory 105 and/or cache 107.

One or more I/O interfaces 115 may allow for input and output of data with other devices that may be connected to data processing system 100. For example, I/O interface 115 can provide a connection to one or more external devices 117 such as one or more audio/visual (AV) receiver devices 207, IoT devices, recording devices 206 such as an audio recording devices or cameras, one or more sensor device(s) 204, input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display device 118. Display device 118 provides a mechanism to display data to a user and can be, for example, a computer monitor, screen, television, projector, display panel, movie theatre screen, etc. Display devices 118 can also be an incorporated display and may function as a touch screen as part of a built-in display of a tablet computer or mobile computing device.

System for Managing Content Transmission and Display of Multiple Content Sources Referring to the drawings, FIGS. 2a-6 depict an approach that can be executed using one or more data processing systems 100 operating within a computing environment 200, 220, 300, and variations thereof, to implement systems, methods and computer program products for managing the transmission and display of content from a plurality content sources 209 viewable on the same display device 118. Output of the different content sources 209 on the display device 118 can be simultaneously and independently viewed by a plurality of users selecting the content to view. Embodiments of computing environments 200, 220, 300 may include one or more data processing systems 100 interconnected via a device network 250. The data processing systems 100 connected to the device network 250 may be specialized systems or devices that may include, but are not limited to, the interconnection of one or more host system 203, display device 118, A/V receiver device 207, recording device 206, and/or sensor device 204. The data processing systems 100 exemplified in FIGS. 2a-6 may not only comprise the elements of the systems and devices depicted in the drawings of FIGS. 2a-6, but the specialized data processing systems depicted in FIG. 2a-6 may further incorporate one or more elements of a data processing system 100 shown in FIG. 1 and described above. Although not shown in the figures, one or more elements of the data processing system 100 may be integrated into the embodiments of host system 203, display device 118, A/V receiver device 207, recording device 206, and/or sensor device 204, including (but not limited to) the integration of one or more processor(s) 103, program(s) 114, memory 105, persistent storage 106, cache 107, communications unit 111, input/output (I/O) interface(s) 115, external device(s) 117 and display device 118.

Embodiments of the host system 203, display device 118, A/V receiver device 207, recording device 206, content sources 209 and/or sensor device 204 may be placed into communication with one another via computer network 250. Embodiments of network 250 may be constructed using wired, wireless or fiber-optic connections. Embodiments of the host system 203, display device 118, A/V receiver device 207, recording device 206, content sources 209 and/or sensor device 204 may connect and communicate over the network 250 via a communications unit 111, such as a network interface controller, network interface card, network transmitter/receiver 219 or other network communication device capable of facilitating communication within network 250. For example, in exemplary embodiments, communication over network 250 may occur using a 5g-enabled network transmitter/receiver 219 or a Wi-Fi 6-enabled network transmitter/receiver 219. In some embodiments of computing environments 200, 220, 300, one or more host systems 203, display device 118, A/V receiver device 207, recording device 206, sensor device 204 or other data processing systems 100 may represent data processing systems 100 utilizing clustered computers and components acting as a single pool of seamless resources when accessed through network 250. For example, such embodiments can be used in a data center, cloud computing network, storage area network (SAN), and network-attached storage (NAS) applications.

Embodiments of the communications unit 111 such as the network transmitter/receiver 219, may implement specialized electronic circuitry, allowing for communication using a specific physical layer and a data link layer standard. For example, Ethernet, Fiber channel, Wi-Fi, 5G cellular transmissions or Token Ring to transmit data between the host system 203, display device 118, A/V receiver device 207, recording device 206, content sources 209 and/or sensor device 204 connected to network 250. Communications unit 111 may further allow for a full network protocol stack, enabling communication over network 250 to groups of host systems 203, display devices 118, A/V receiver devices 207, recording devices 206, content sources 209 and/or sensor devices 204 and other data processing systems 100 linked together through communication channels of network 250. Network 250 may facilitate communication and resource sharing among host systems 203, display devices 118, A/V receiver devices 207, recording devices 206, content sources 209, sensor devices 204 and other data processing systems 100 connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks, wireless communication networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, smart devices, IoT devices, virtual assistant hubs, etc.).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 250 of interconnected nodes 310.

Figure 3:
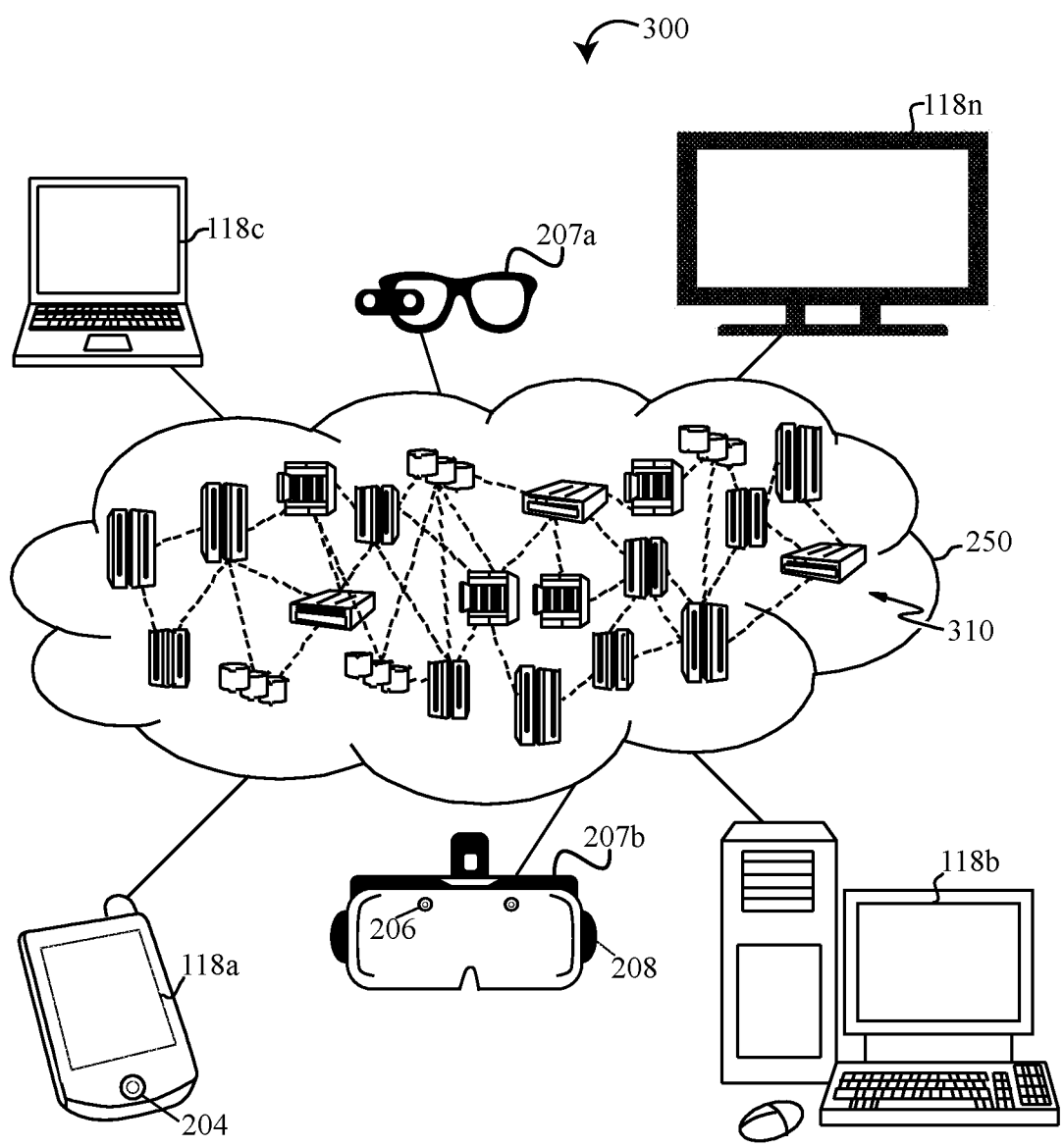
FIG. 3 depicts an embodiment of a cloud computing environment within which embodiments described herein may be implemented in accordance with the present disclosure.

Referring to the drawings, FIG. 3 is an illustrative example of a cloud computing environment 300. As shown, cloud computing environment 300 includes one or more cloud computing nodes 310 with which client systems, such as display device 118 and/or A/V receiver 207 function as a user-controlled device operated by cloud consumers. User-controlled devices may communicate with host systems 203 of the cloud computing environment 300 through an interface accessed through one or more client systems connected to the cloud network, for example via display devices 118a, 118b, 118c, 118n as illustrated in FIG. 3. Nodes 310 of the cloud computing environment 300, such as one or more host systems 203, may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms and/or software as services for which a cloud consumer does not need to maintain resources on the display devices 118, A/V receivers 207 or other clients connecting or communicating with the host system 203. It is understood that the types of client devices connected to the cloud computing environment 300, are intended to be illustrative only and that computing nodes 310 of the cloud computing environment 300 can communicate with any type of computerized device over any type of network and/or network addressable connection (e.g., using a web browser).

Figure 4:
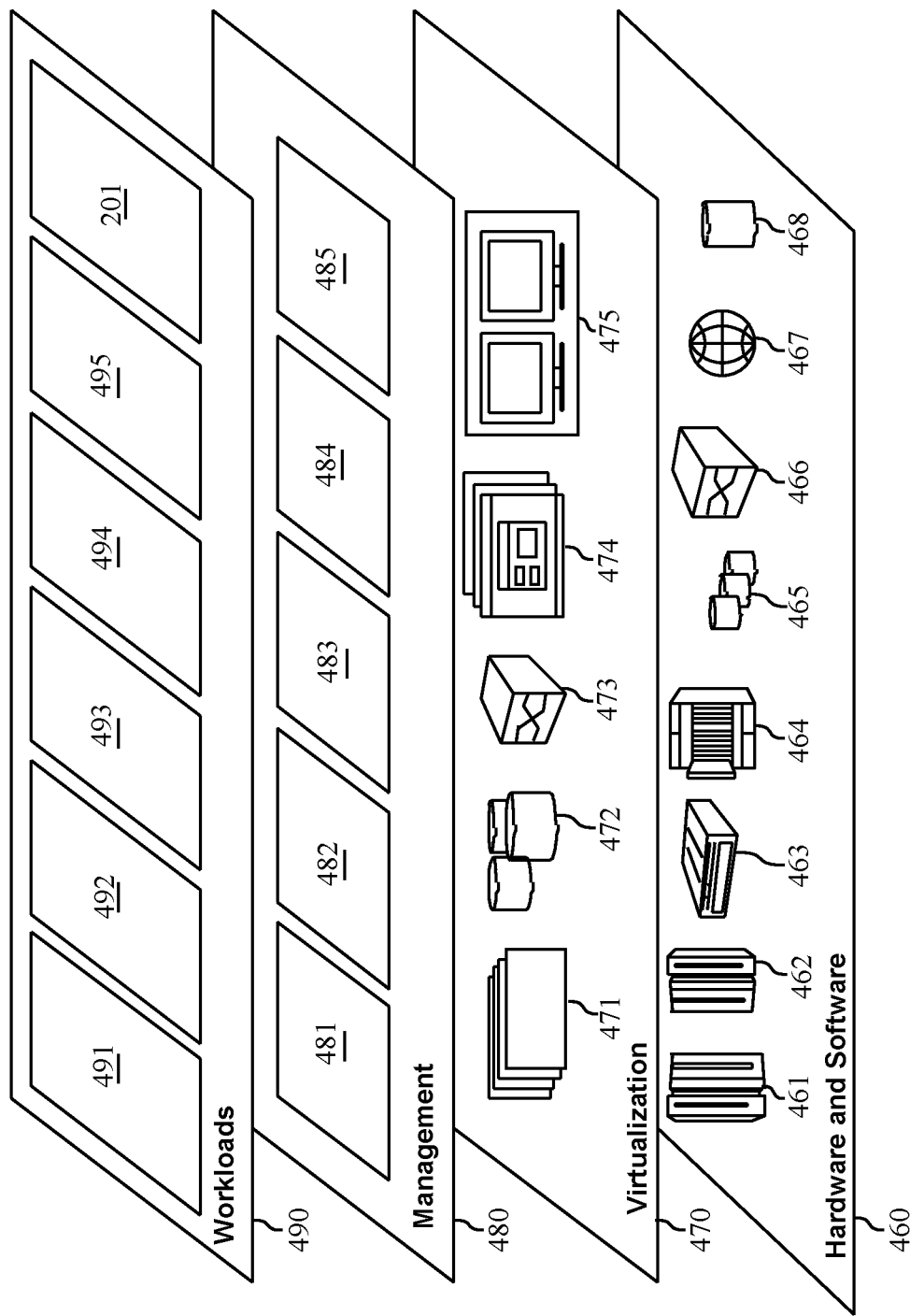
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. For instance, a license to the digital multi-screen engine 201 described in detail herein. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping and navigation 491, software development and lifecycle management 492, data analytics processing 493, virtual classroom education delivery 494, transaction processing 495, and DMSE 201 offered by cloud computing environment 300, which can be accessed through the DMSE interface 205 provided by the display device 118 or other data processing system 100.

Figure 2A:
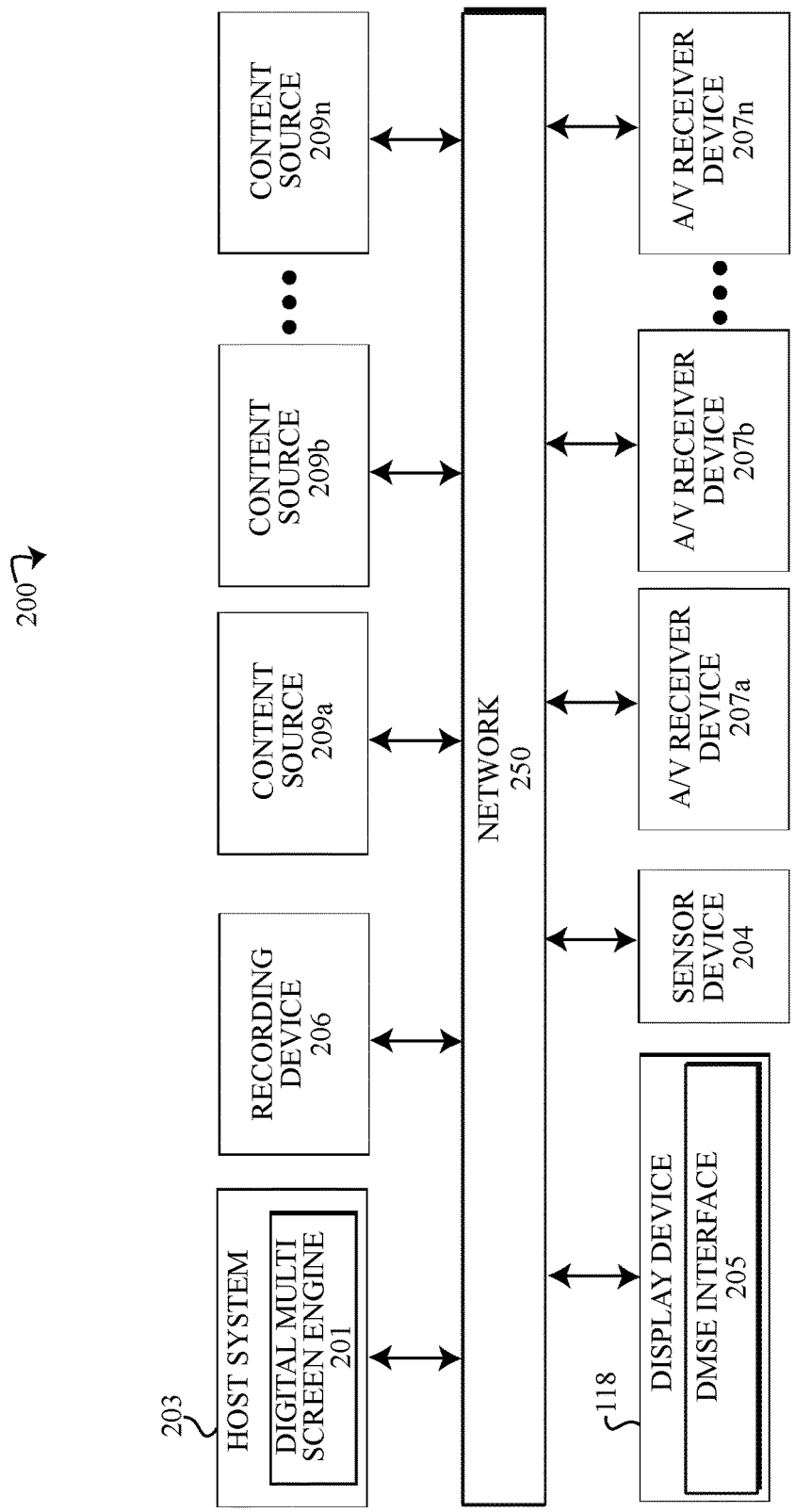
FIG. 2a depicts a block diagram of an embodiment of a computing environment for displaying multiple sources of content to a plurality of users of a display device in accordance with the present disclosure.

Referring back to the drawings, FIG. 2a depicts an embodiment of a computing environment 200 capable of managing the transmission and display of content available from one or more content sources 209a, 209b . . . 209n (referred to generally or collectively as content sources 209) on a display device 118. The computing environment 200 depicted in FIG. 2a depicts a display device 118 capable of managing a plurality users simultaneously viewing different content sources 209 on the same display device 118 while users are dynamically connecting to and/or disconnecting from the display device 118 via one or more A/V receiver devices 207 throughout the transmission and delivery of content to the connected users. Embodiments of the display device 118 may be any human-readable display, including but not limited to televisions, monitors, digital screens, digital projectors, cinema screens, mobile device screens, touch pads, tablets or any other type of display or system capable of outputting audio and/or video. Embodiments of the display device 118 may be connected to a network 250 as shown in FIG. 2a, communicate with and manage requests received from one or more devices connected to the network 250 as shown. For example, display device 118 may manage requests and deliver content from one or more content sources 209 via network 250 to one or more A/V receiver devices 207 synchronized to the display device 118.

Management of the multiple A/V receivers 207 connecting to the display device 118, content requests received by the display device 118 and/or transmission of the content to the A/V receivers 207 may be performed using an interface loaded into the memory 105, cache 107 and/or persistent storage 106 of display device 118. For example, as shown in FIG. 2a, the display device 118 can comprise an interface component running as a program 114, application or service loaded on the display device 118. The interface is described herein as the DMSE interface 205. Embodiments of the DMSE interface 205 may allow users to access, interact and communicate with a host system 203 or a service provider of the digital multi-screen engine (DMSE) 201 maintaining the operation and delivery of one or more features to the users of the display device 118 via DMSE interface 205. Through the DMSE interface 205 users may identify themselves to DMSE 201, login to the DMSE 201, load user profiles 228 with customized settings 223 or rule sets 227, select and/or experience content from one or more available content sources 209.

Embodiments of DMSE 201 may be described as comprising one or more components responsible for performing one or more functions, tasks or processes responsible for identifying content sources 209 available over network 250, assigning content sources 209 to a process ID, pulling, processing and storing frames of the content sources 209 to memory 105 or cache 107 or other storage devices allocated to the process ID and delivering the frames of content extracted from the content sources 209 to the display device 118 or A/V receiver 207. Embodiments of the DMSE 201 may also perform functions relating to the creation and maintenance of user profiles 228, settings 223, and rules 227, identifying the presence of users within a viewable area of a display device 118, interpreting voice commands into on-screen actions displayed by the display device 118 and/or A/V receiver 207. Embodiments of DMSE 201 may be part of a monolithic program or application, a process, service, microservice, an API, or a containerized variation thereof which may include the software code and all software dependencies within the computing environment of the container being executed to delivery DMSE 201 features and functions. Embodiments of the DMSE 201 may be made available to one or more display devices 118 connected to the network 250 via a host system 203, which may be a real or virtualized node of network 250 hosting DMSE 201 or part of a data center connected to network 250. In an exemplary embodiment, the host system 203 may be an edge node of network 250 running as part of a public, private or hybrid cloud computing environment.

Embodiments of DMSE 201 may comprise one or more components or modules that may be tasked with implementing the functions, tasks or processes of DMSE 201. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized data processing systems 100 operating as part of the computing environment 200. For example, the DMSE 201 module, program, service and/or application depicted in FIG. 2a, can be loaded into the memory 105, persistent storage 106 or cache 107 of the host system 203.

Figure 2B:
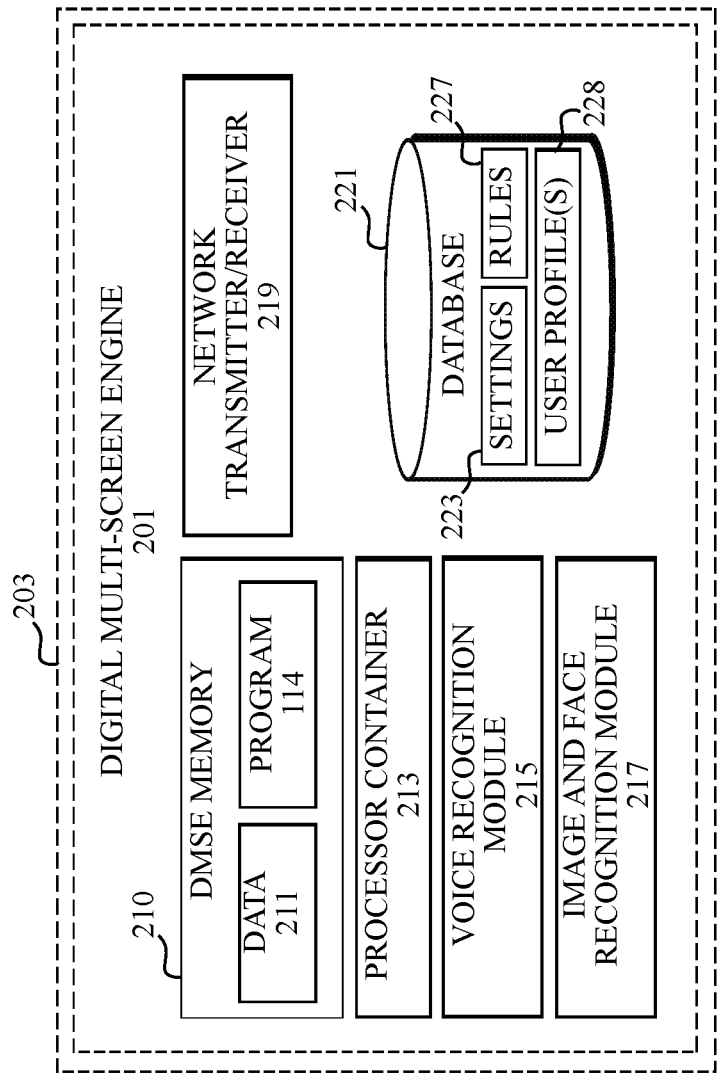
FIG. 2b depicts a block diagram of an embodiment of components of a digital multi-screen engine (DMSE) in accordance with the present disclosure.
Figure 2C:
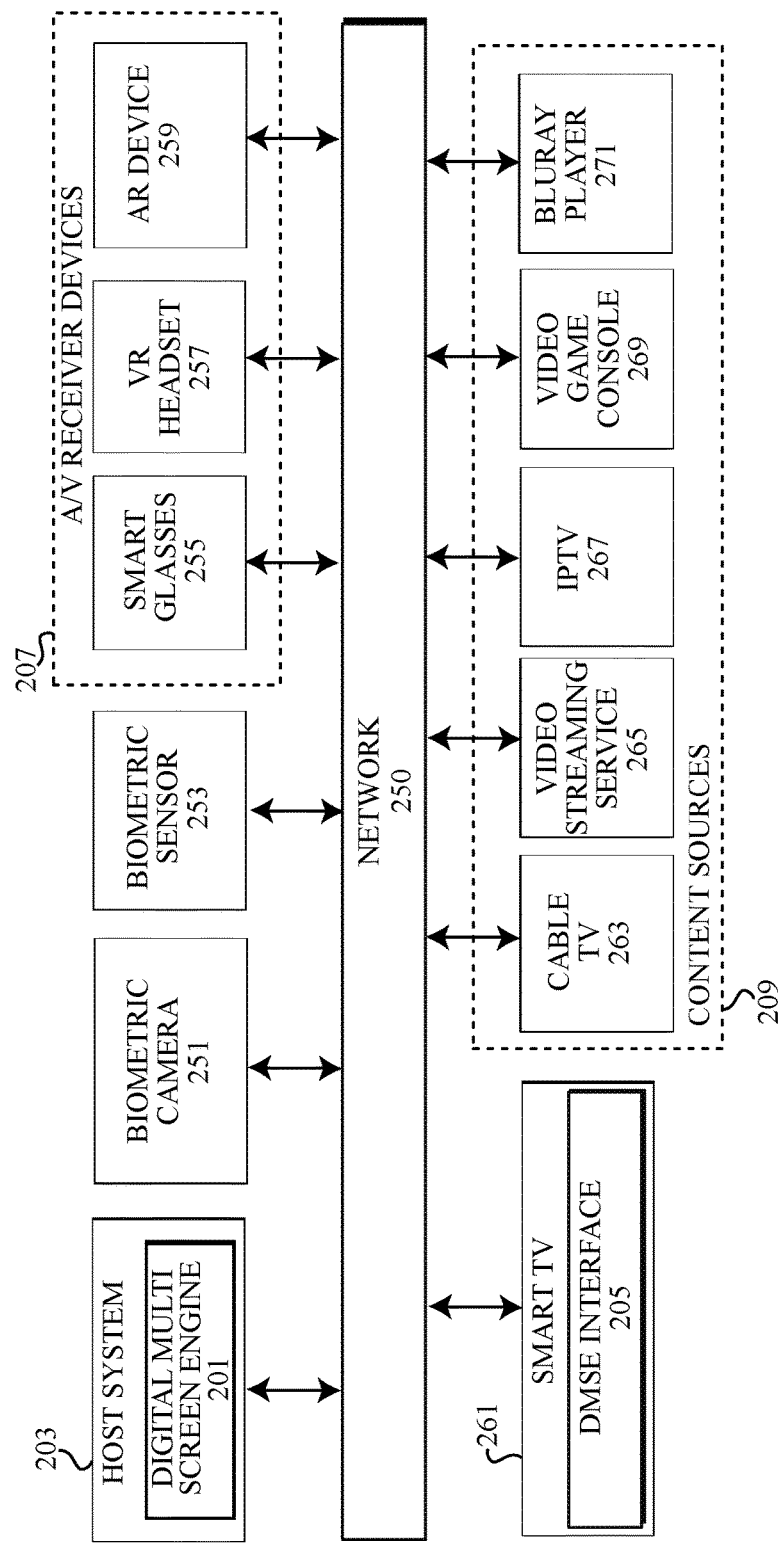
FIG. 2c depicts a block diagram of a more specific embodiment of a computing environment for displaying multiple sources of content to a plurality of users of a display device in accordance with the present disclosure.

FIG. 2b illustrates an exemplary embodiment of DMSE 201 comprising DMSE memory 210, processor container 213, voice recognition module 215, image and face recognition module 217, network transmitter/transceiver 219 and database 221. Embodiments of the DMSE memory 210 component may be a memory 105, cache 107, persistent storage 106, and/or virtualized or containerized representations thereof, capable of storing data 211 or program 114 information requested by one or more users interacting with DMSE 201 through the DMSE interface 205. Embodiments of DMSE memory 210 may be instructed to assign process IDs to the content sources 209 available for viewing through the network 250. Memory 105, cache 107 memory or storage space of the DMSE memory 210 component may be allocated to the process IDs associated with the content sources 209. Audio and/or video frames extracted from the content sources 209 may be stored by DMSE 201 in the DMSE memory 210 allocation to a designated process ID associated with the content source 209. As users connect the DMSE interface 205 and request to view the frames of the content source 209 stored by the DMSE memory 210, the stored frames can be read from the DMSE memory 210 associated with a process ID of the requested content and transmitted to the display device 118 and/or A/V receiver 207 in response to the user request to view the content of the stored frames.

Content sources 209 may refer to systems, servers, services, application and/or devices connected to network 250 and/or connected to one or more inputs of a display device 118 that may provide text, images, video, audio or other forms of content that may be viewable on a display device 118. For example, content sources 209 may stream over the network 250 to the DMSE 201 or display device 118 may include (but are not limited to) broadcast television networks, cable or satellite television broadcasts networks 263, audio and/or video streaming services 265, video game streaming services, network accessible servers, internet protocol television 267, video game consoles 269, VCRs, DVD players, Blu-ray® players, home media devices, virtualized assistant hubs and/or IoT devices. In some instances, hardware devices containing the content of the content source 209 may be connected to an input of the display device 118, rather than remotely accessible over network 250. For example, by being directly connected to one or more ports of the display device 118, such as through VGA, composite, HDMI, DisplayPort, Thunderbolt, USB or other port known to a person skilled in the art to transport audio and/or video data.

Referring back to FIG. 2b, embodiments of DMSE 201 may further comprise a processor container 213. The processor container 213 may be described as the logical and/or control component of the DMSE 201. Processor container 213 may be responsible for managing interactions between DMSE 201 and other processing systems of the network 250, including interactions with the content sources 209, A/V receivers 207, recording devices 206, sensor devices 207, reading and writing operations to database 221 and user requests inputted into the DMSE interface 205. Embodiments of processor container 213 may assign process IDs to each of the available content sources 209 connected to the network 250 (either directly connected or indirectly connected through the display device 118), assign a frequency or frequency band to established frequency connections associated with the process IDs, allocate memory 105, cache 107 or storage space to process IDs stored by the DMSE memory 210, instruct the DMSE memory 210 to save frames of the content sources 209 and determine which process IDs to associate with the saved frames.

In some embodiments users may provide requests and instructions to DMSE 201 using voice commands and/or incorporate the use of a virtual assistant into the DMSE interface 205 to communicate with users and process requests. For example, users connecting to DMSE 201 using the DMSE interface 205 may enable the virtualized assistant as part of the DMSE interface 205. A user's interaction with the DMSE interface 205 may login, request content from content sources 209, or issue commands to DMSE 201 using voice commands and/or auditory cues through the virtual assistant. The voice commands or auditory cues may be recorded by a recording device 206, such as a microphone, camera system or digital recorder. Embodiments of DMSE 201 may include a voice recognition module 215 that is capable of receiving voice-based commands or requests and interpret user voice activity and/or translate the voice activity into instructions. For instance, a user may interact with a virtualized assistant of the DMSE interface 205 and request to "view a streaming service". The inputted instruction may be recorded by a recording device 206, then analyzed by the voice recognition module 215 and interpreted into the appropriate instruction to transmit the stored frames of the content source 209 associated with a video streaming service 265 to the display device 118 and/or an A/V receiving device 207 operated by the requesting user.

In some embodiments of the DMSE 201, user's may login to the DMSE 201 using biometric data stored by the DMSE 201. For example, a voice pattern of a user stored by database 221. Embodiments of the voice recognition module 215 may perform tasks or functions associated with receiving a recorded vocal pattern of a user logging into the DMSE 201, matching the vocal pattern recorded to vocal pattern data sets stored by the database 221. Upon matching the vocal patterns recorded with the stored user vocal pattern of a registered user, access credentials allowing access to DMSE 201 can be validated and processor container 213 may load the user profile 228 associated with the matching vocal pattern identified by the voice recognition module 215.

Embodiments of DMSE 201 may further comprise an image and face recognition module 217. The image and face recognition module 217 may perform functions, tasks and processes associated with identifying users that may enter or leave the viewing area of display device 118 and process biometric data collected by one or more recording devices 206 and/or sensor devices 204. The image and face recognition module 217 may match biometric data collected and stored by database 221 to a user profile 228 and instruct DMSE 201 to allow the requesting user to access DMSE 201 and/or load the user profile 228 upon a successful match of the recorded biometric data to the identified user. For example, a user entering within a field of view of a display device 118 interacts with a sensor device 204, such as a biometric sensor 253 scanning a fingerprint of the user attempting to access DMSE 201. In another embodiment, a sensor device 204 may sense a new user has entered the field of view of display device 118 and employ a recording device 206, such as a camera system or biometric camera 251 to scan a user for biometric data. For instance, identifying the user by facial data, retina scan, body movements, gait, etc. The data collected by recording device 206 and/or sensor device 204 may be processed by the image and face recognition module 217 to draw conclusions about the potential user entering or leaving a viewable area of the display device 118. The image and face recognition module 217 may compare and match the collected biometric data obtained by recording device 206 and/or sensor device 204 with biometric data previously collected or provided by users and/or stored within database 221. In some embodiments, the biometric data might not be stored as part of database 221, but rather may be accessible to the DMSE 201 over network 250. In such an instance that the biometric data is available remotely over network 250, the image and face recognition module 217 may access one or more data sources connected to network 250 and match the collected biometric data to the data accessible to the image and face recognition module 217 over network 250.

Figure 5A:
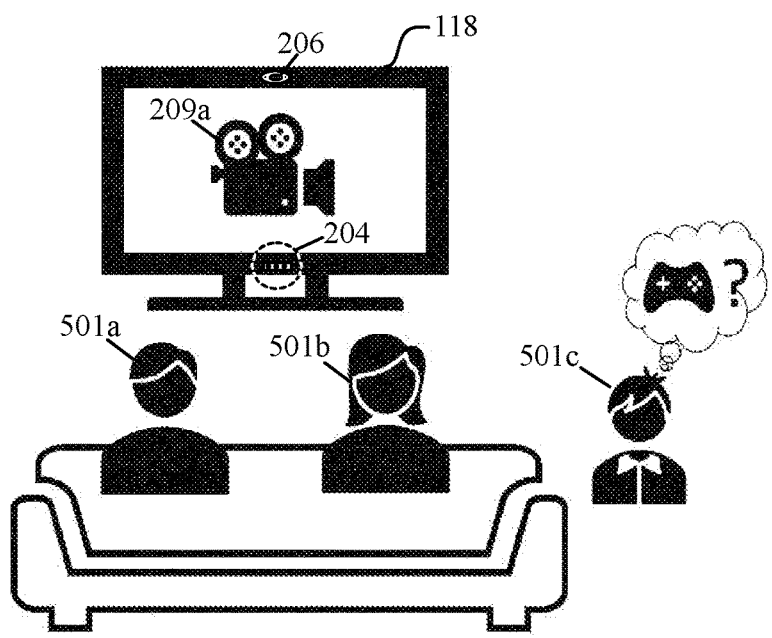
FIG. 5a illustrates an embodiment of the present disclosure displaying content from a first content source to a plurality of users of a display device.
Figure 5B:
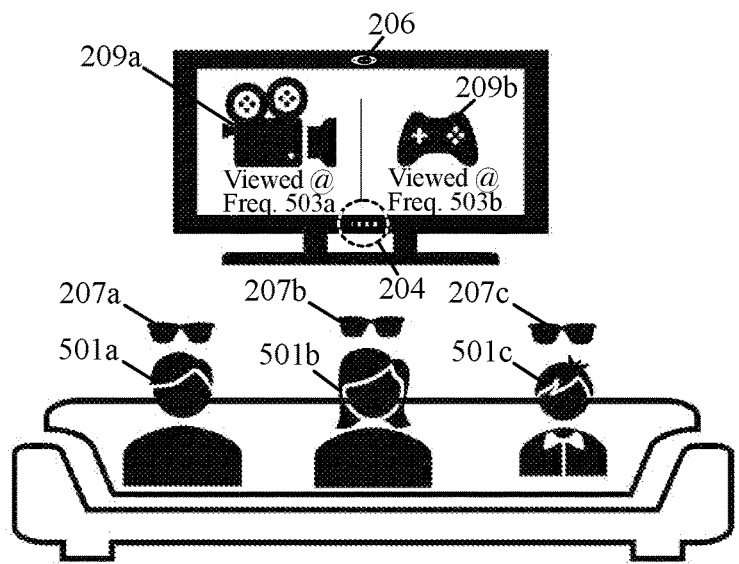
FIG. 5b illustrates an embodiment of the present disclosure displaying content from a first content source to a set of viewers on a display device, and a second content source to a second set of viewers on the same display device simultaneously.
Figure 5C:
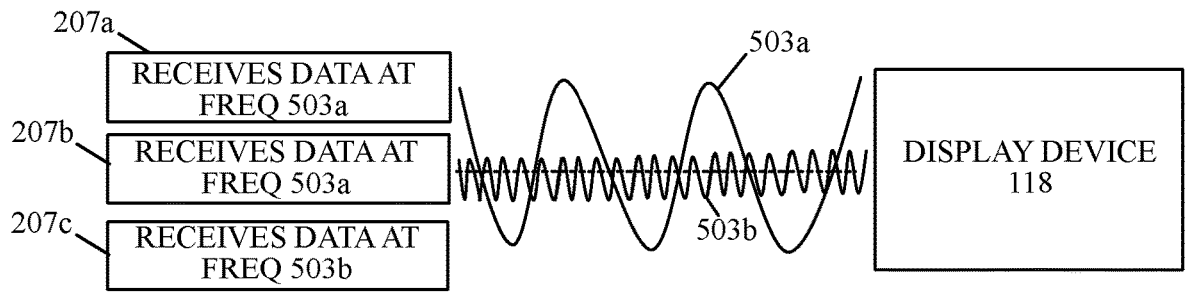
FIG. 5c illustrates an embodiment of the present disclosure for transmitting different content sources simultaneously to different sets of users of the same display device, over one or more different frequency connections.

Embodiments of recording devices 206 and/or sensor devices 204 may be integrated into the display device 118 in some embodiments as shown in the example depicted in FIG. 5a-5b. In alternative embodiments, the recording devices 206 and/or sensor devices 204 may be standalone systems or devices that are separate from the display device 118 or integrated into A/V receiver 207. For example, by providing a sensor device 204 that a user can access to unlock the A/V receiver, such as by scanning a fingerprint via a fingerprint sensor to sign in and access one or more features of an A/V receiver. In some embodiments, the recording device 206 and/or sensor device 204 may be integrated into a data processing system 100 connected to network 250 or attached to a data processing system 100 of network 250 as an external device 117. Examples of biometric data that may be collected and used by recording devices 206 and sensor devices 204 to detect or identify users may include, but are not limited to fingerprints, shapes of hands, shapes of fingers, vein patterns, iris or retina patterns, face shape, vocal patterns, voice recognition, signature dynamics such as signature movement speed, acceleration, pressure, and inclination, keystroke dynamics, object use patterns, gait, a sound of a user's footsteps, and/or other identifiable physiological patterns.

Embodiments of the DMSE 201 may further comprise a database 221 or may connect to a remote database 221 through the network 250, such as a network-accessible repository. Database 221 may function as an organized collection of data that may be generally stored and/or accessed electronically by the DMSE 201, host system 203 and/or another computer system connected to network 250. Embodiments of database 221 may collect and store data, such as user profiles 228 describing user preferences, settings 223 and/or rules for accessing DMSE 201 and/or content sources 209. For example, embodiments of user profiles 228 may store user login credentials, including login name/passwords, biometric data, content preferences, favorite channels, bookmarked content, favorite applications or games, friends lists, session history, viewing history, etc. In some embodiments, the database 221 may store user settings 223, either as part of the user profile 228 or separately therefrom. Settings 223 maintained by the database may include connection settings to the network 250, preferred A/V receiver 207 and/or display device 118 connection or synchronization settings, such as preferred frequencies, channels, transmission protocols, etc. In some instances, the settings 223 may comprise viewing settings, on the A/V receiver 207 or display device. For example, picture and/or audio settings for the selected A/V receiver 207 or display device 118. For instance, audio format, audio quality, default volume, image resolution, image coloration, color temperature, brightness, sharpness, subtitles, etc. In some embodiments, settings 223 may include user preferences for visualization of content from one or more content sources 209 being played through display device 118. For example, settings for A/V receiver 207 may include default settings or rules 227 for when to play content from a content source 209 on display device 118, when to display the content as augmented reality on the display device 118 and when to display the content as virtual reality. In another example, settings 223 or rules 227 may guide DMSE 201 when to enable or disable subtitles on a content source 209, or enable additional accessibility options such as zoom, color filters for color blind users, image filters such as black/white coloration, etc.

Furthermore, in some embodiments, database 221 may comprise one or more rules 227 governing a user's experience or ability to access content from a content source. For example, rules 227 may include parental control rules limiting a particular user's ability to view content sources 209, an amount of time a user can view content, limit the times of day users can access content sources 209 or which content sources 209 a user can view. In some embodiments, rules 227 may be content provider-enforced restrictions, that may limit a user's access to a content source 209. For example, requiring a subscription to access a particular video streaming service 265 or a television channel.

Embodiments of the computing environment 200, 220, 300 may comprise one or more A/V receivers 207a, 207b . . . 207n (referred herein generally as A/V receivers 207). Embodiments of the A/V receivers 207 can be any audio/visual device capable of receiving and outputting audio frames and/or outputting video frames processed by the DMSE 201. The A/V receivers 207 may receive the frames wirelessly as the frames are transmitted over network 250 from a host system 203 or wirelessly transmitted from display device 118. A/V receivers 207 may include audio output capabilities which may include onboard headphones 208 or speakers that can be used or worn by users of the A/V receiver 207 receiving content from content source 209. Moreover, in some embodiments, A/V receivers 207 may further comprise a built-in recording device 206 and/or sensor device 204 to input commands, authenticate or identify the user controlling the A/V receiver 207. For example, a microphone for inputting voice commands or for interacting with a virtual assistant of the DMSE interface 205, communicating amongst other users who may be wearing a separate A/V receiver 207, logging into the DMSE interface 205 and/or selecting content sources 209 to access.

Embodiments of the A/V receivers 207 may include augmented reality capabilities, virtual reality capabilities and/or a mix of A/R and VR capabilities. Display capabilities, whether A/R, VR or a combination thereof, may be dependent upon the type of A/V receiver 207, selectable by the user through the DMSE interface 205 or onboard interface of the A/V receiver 207, selected by the DMSE 201 and/or a combination of display capabilities thereof. For example, an A/V receiver 207 operating in an augmented reality mode may be able to view physical space around the user and/or physical space surrounding the display device 118 while looking through a view finder or lens of the A/V receiver 207 and upon receiving frames of content transmitted to the A/V receiver 207, overlay the frames over the screen of the display device 118 when the user looks through the A/V receiver 207 and is viewing the display device 118 or emulate the frames over top of the display device 118. In other embodiments, while looking through the A/V receiver 207 in VR mode, the A/V receiver 207 may project a virtual world within the headset of the A/V receiver 207. The A/V receiver 207 operating in VR mode can output audio frames to the A/V receiver 207 headphones 208 or speakers and/or the display the video frames of the selected content source 209 being projected within the virtualized environment viewed through the headset or other viewing area of the A/V receiver 207.

In some embodiments, A/V receiver 207 may comprise a mix of A/R and VR environments, allowing for users to view the content as augmented reality overlaying content frames onto the display device 118, and/or alongside virtual reality features capable of displaying virtualized environments the surrounding of the display device 118 along with virtualized elements displaying applications and controls and/or GUI interfaces of the DMSE interface 205 viewable to the user through the A/V receiver 207, but not other surrounding individuals. For example, In a mixed reality mode, the A/V receiver 207 may be an enclosed VR headset 257 that can display virtualized environments, but additionally my comprise one or more camera systems or other recording devices 206 on the VR headset 257 that may record the physical world surrounding the user and integrate real world surroundings into the virtual environment. For instance, by allowing the user to view a real world display device 118 within a virtualized living room. Examples of A/V receivers 207 may include AR-enabled devices 259 such as smart glasses 255, A/R-enabled mobile devices, headsets, smart phones and/or tablet computers, holographic displays, HUDS, AR-enabled contact lenses, as well as VR-enabled mobile devices, tablets, lenses, holographic displays, HUDS, smart phones, tablets IoT devices, and VR headsets 257.

Referring to the drawings, FIG. 5a-5b depict an example implementing one or more components of computing environment 200, 220, 300 to display a plurality of different content sources selected by one or more users on a display device 118 at the same time. As shown in FIG. 5a, a first user 501a and a second user 501b are viewing a first content source 209a on a display device 118. A shown in FIG. 5a, the first user 501a and second user 501b may optionally be view the first content source 209a on the display device 118 directly without viewing the first content source 209a through an A/V receiver 207, since only a single content source 209 is being displayed at the present moment. This may allow anyone passing by to view the content source 209 being exhibited by the display device 118. However, in some embodiments, a first user 501a and/or a second user 501b may equip an A/V receiver 207 and view the content on display device 118 through the A/V receiver 207. For example, independent viewing of the same content source may be desired if the first user 501a and second user 501b have different preferences viewing the image being displayed by display device 118. For instance, preferences for coloration, hue and temperature of the frames displayed from a content source 209 as well as enabling or disabling subtitles may be customized and viewed by the first user 501a and/or second user 501b, allowing the first user 501a to experience a different customized image of the first content source 209a when viewed through a first A/V receiver 207a than the second user 501b viewing the same first content source 209a through a second A/V receiver 207b. Thus, allowing users who are even viewing the same content source 209 to customize different viewing experience and display of the images overlaid onto the display device 118 when viewed through an A/V receiver 207 in accordance with each users' preferences and needs.

Moreover, while viewing the same content source 209, the first user 501a or second user 501b may be at different time points in the content being viewed. For example, first user 501a or second user 501b has to pause or stop viewing the first content source 209a for a period of time while the other user continues to view the first content source 209a. When user who paused or stopped the first content source picks up where they left off, the first user 501a or second user 501b may pick up the viewing experience where they left off by continuing to view through an A/V receiver 207, rather forcing the other user to backtrack and revisit content that was previously viewed.

As further shown in FIG. 5a, one or more components of the computing environment 200, 220, 300 may detect the presence of a third user 501c entering the viewing area of display device 118. The third user 501c can be detected by the recording device 206 and/or sensor device 204 which in this figure are integrated into the display device 118, however, in some embodiments the recording device 206 and/or sensor device may be a separate device or component from the display device 118. As shown in FIG. 5a, the third user seeks to access and view a second content source 209b. Upon entering the viewing area of the display device 118, the third user 501c may be using a A/V receiver 207c and may be able to view the DMSE interface 205 through the A/V receiver 207c. Moreover, third user 501c may be able to login and/or present access credentials to use DMSE 201 through the DMSE interface 205 without interrupting the viewing experience of the first user 501a and second user 501b. In some embodiments, identification, login or logout of users 501 within the viewing area of the display device may be automated using sensor device 204 and/or recording device 206. Embodiments of the sensor device 204 and/or recording device 206 may detect the presence of the third user 501c by scanning the viewing area of the display device 118, collecting biometric data of each user 501a, 501b, 501c within the viewing area, and matching the collected biometric data to biometric data stored to database 221. As new users enter the area, the users 501 may be automatically logged in based on the detection of new biometric data or automatically logged out upon leaving the viewing area and the biometric data of the user 501 is no longer detected. Once logged in and able to access DMSE 201 through the DMSE interface 205, the third user 501c may load the user profile 228, settings 223 rules 227 and/or other personalized features associated with the third user 501c. Third user 501c may view available content sources 209 accessible for display on display device 118 when viewed through the third user's 501c A/V receiver 207c.

FIG. 5b depicts an embodiment of a continuation of the scenario depicted in FIG. 5a, wherein a new user (in this example third user 501c) connects to DMSE 201 via DMSE interface 205 to view a second content source 209b at the same time as the first content source 209a being viewed by first user 501a and second user 501b. As shown in FIG. 5b, first user 501a and second user 501b can view a first content source 209a on display device 118 through the first A/V receiver 207a worn by the first user 501a and the second A/V receiver 207b worn by the second user 501b. Viewing the first content source 209a may vary depending on the type of A/V receiver 207 worn by the first user 501a and the second user 501b. For example, the first A/V receiver 207a worn by the first user 501a may be a pair of smart glasses 255 operating in A/R mode. The first A/V receiver 207 may be receiving the audio frames of the first content source 209a in the headphones 208 of the first A/V receiver 207a, and the first user 501 may use A/R to view the video frames of the first content source 209a being transmitted at a first frequency 503a by looking through the lenses of the smart glasses 255 at display device 118. As the first user 501a views the display device 118 through the lenses of the first A/V receiver 207a, the first user 501a can observe the video frames stored by the DMSE 201 being transmitted to the first A/V receiver 207a at the first frequency 503a and therefore, the frames of the first content source 209a are viewed by the first user 501a as being overlaid onto the screen of the display device 118. Similarly, second user 501b may view the same content source 209a through the second A/V receiver 207b as shown in FIG. 5b. For example, the second A/V receiver 207b could be an A/R device 239 and/or a VR headset 257 receiving audio frames and/or video frames through the frequency connection with the display device 118, at the first frequency 503a and outputting the audio frames stored by the DMSE 201 to the headphones of the second A/V receiver 207b and the video frames stored by DMSE 201 are displayed to the second user 501b. For example, video frames may be displayed within a virtualized environment if the second A/V receiver 207b is a VR headset 257, and/or overlaid onto display device 118 when the second user 501b views the display device 118 through a lens of second A/V receiver 207 operating as an A/R device 259.

While first user 501a and second user 501b view a first content source 209a on display device 118, a third user 501c may select to join in and view the same content as first user 501a and second user 501b and select whether to view the first content source 209a directly on the display device 118 or on A/V receiver 207c. Conversely, third user 501c may select to view a second content source 209b on the same display device 118, without users 501a and 501b seeing the second content source 209b (unless the users 501a or 501b switch their selected content source 209 to the second content source 209b). As the third user 501c is detected by the sensor device 204, recording device 206 and/or logins to the DMSE 201 through the DMSE interface 205, the third user 501c can select the second content source 209b that is different from the first content source 209a being viewed by the other users. The display device 118 can establish a second frequency connection to the third user's 501c third A/V receiver 207c, at a second frequency 503b or within a frequency band that differs from the first frequency 501a of the first frequency connection. That way, transmission of the first content source 209a over the first frequency connection does not interfere with the transmission of the second content source 209b being transmitted to the third A/V receiver 207c. DMSE 201 can transmit the stored frames of the second content source 209b to display device 118, wherein the third user 501c may view the content of the second content source 209b through the third A/V receiver 207c. For example, by receiving audio frames from the second content source 209b outputted to the headphones 208 of the third A/V receiver 207c and/or synchronizing the video frames of the second content source 209b with the third A/V receiver 207c at the second frequency 503b, allowing the third user to observe the video frames on the display device 118 when viewing the display device 118 through the third A/V receiver 207c (while operating in A/R mode), or within a virtualized environment (or mixed A/R and VR environment) if the third A/V receiver 207c is operating in VR mode or a mode comprising a mix of VR and A/R environments.

Figure 6:
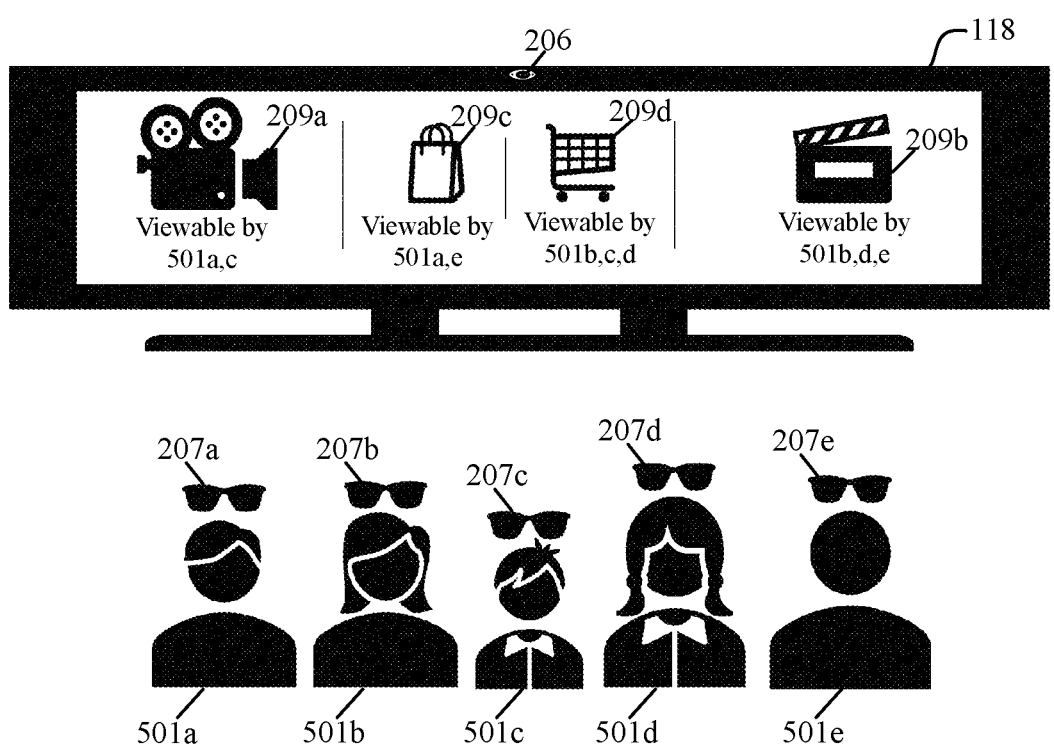
FIG. 6 depicts an alternative embodiment of the present disclosure for simultaneously displaying content from a plurality of content sources to a plurality of viewers viewing different sets of content sources on the same display device.

Referring to the drawings, FIG. 6 depicts an alternative example of an implementation of computing environments 200, 220, 300 described above. In the example of FIG. 6, a plurality of user's may be viewing a mix of different content sources 209a-209d, wherein a first content source 209a and a second content source 209b may be entertainment content selected by users 501a-501e. The third content source 209c and fourth content source 209d may be secondary content being delivered to the users 501a-501e while viewing the selected entertainment content 209a or 209b or interstitially in between the selected content 209a, 209b. For example, the secondary content may be in the form of commercials, advertisements, purchasing offers, product updates, discounts, movie trailers, etc. Embodiments of the secondary content may be tied to a particular entertainment content source 209a, 209b, may be user-specific (i.e. based on user 501 interests, preferences, habits, etc.) randomly delivered to users from a repository of secondary content, or specifically selected by the users 501. The secondary content sources 209c, 209d may be presented as commercial breaks that may briefly interrupt the content source 209 selected for viewing. In alternative embodiments, the secondary content source 209b, 209c may be displayed simultaneously while the user is viewing the selected content 209a, 209b through their respective A/V receiver 207. For example, while the first user 501a is viewing the first content source 209a through the first A/V receiver 207a in an A/R mode, the first user may see the video frames of the first content source 209a overlaid onto the display device 118, while image or video frames of secondary content 209c (such as advertisement) may be viewable adjacent to the display device 118, or periodically interrupting and replacing the first content source 209a to be overlaid onto the display device 118. Likewise, while operating in VR mode or a mixed reality mode, the virtual environment being viewed by the first user 501a through the A/V receiver 207 may display frames of the secondary content source 209c, such as advertising, within the virtual environment while the first user 501a is viewing the video frames of the first content source 209a.

In some embodiments, users viewing the same content source 209 may be viewing different secondary content sources 209c, 209d during their viewing experience. As shown in FIG. 6, a first user 501a and a second user 501c are viewing a first content source 209a through their respective A/V receivers 207a, 207c. While both users 501a and 501c are viewing the same entertainment content (first content source 209a) they may experience different secondary content sources being displayed. For instance, first user 501a experiences secondary content source 209c, while third user 501c experiences secondary content source 209d. Moreover, in this example, second user 501b, fourth user 501d and fifth user 501e are all shown viewing second content source 209b. However, the second user 501b and fourth user 501d experience secondary content 209d while the fifth user 501e experiences the secondary content 209c.

Figure 7A:
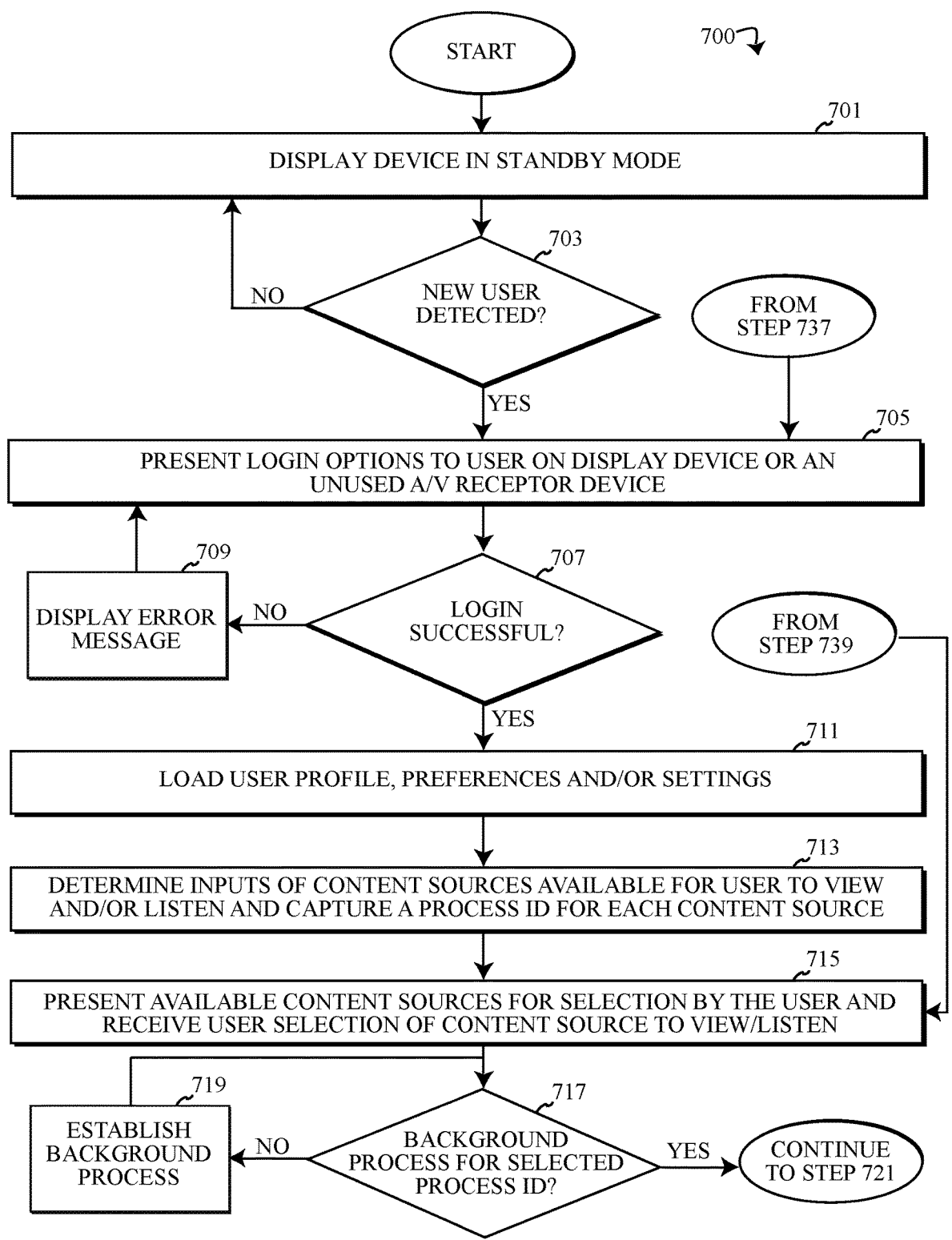
FIG. 7a depicts an embodiment of a method for simultaneously displaying multiple sources of content to a plurality of users of a display device.
Figure 7B:
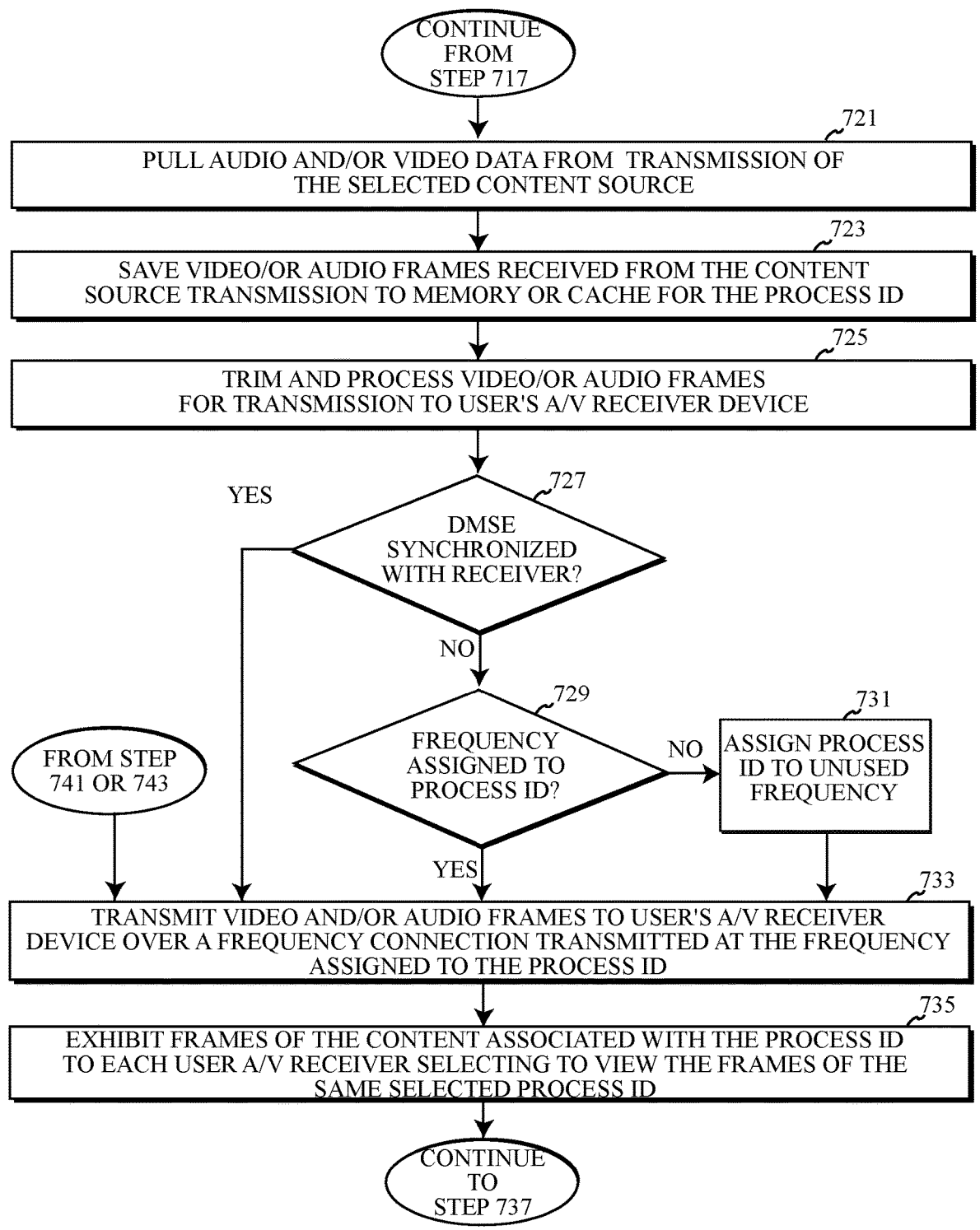
Figure 7C:
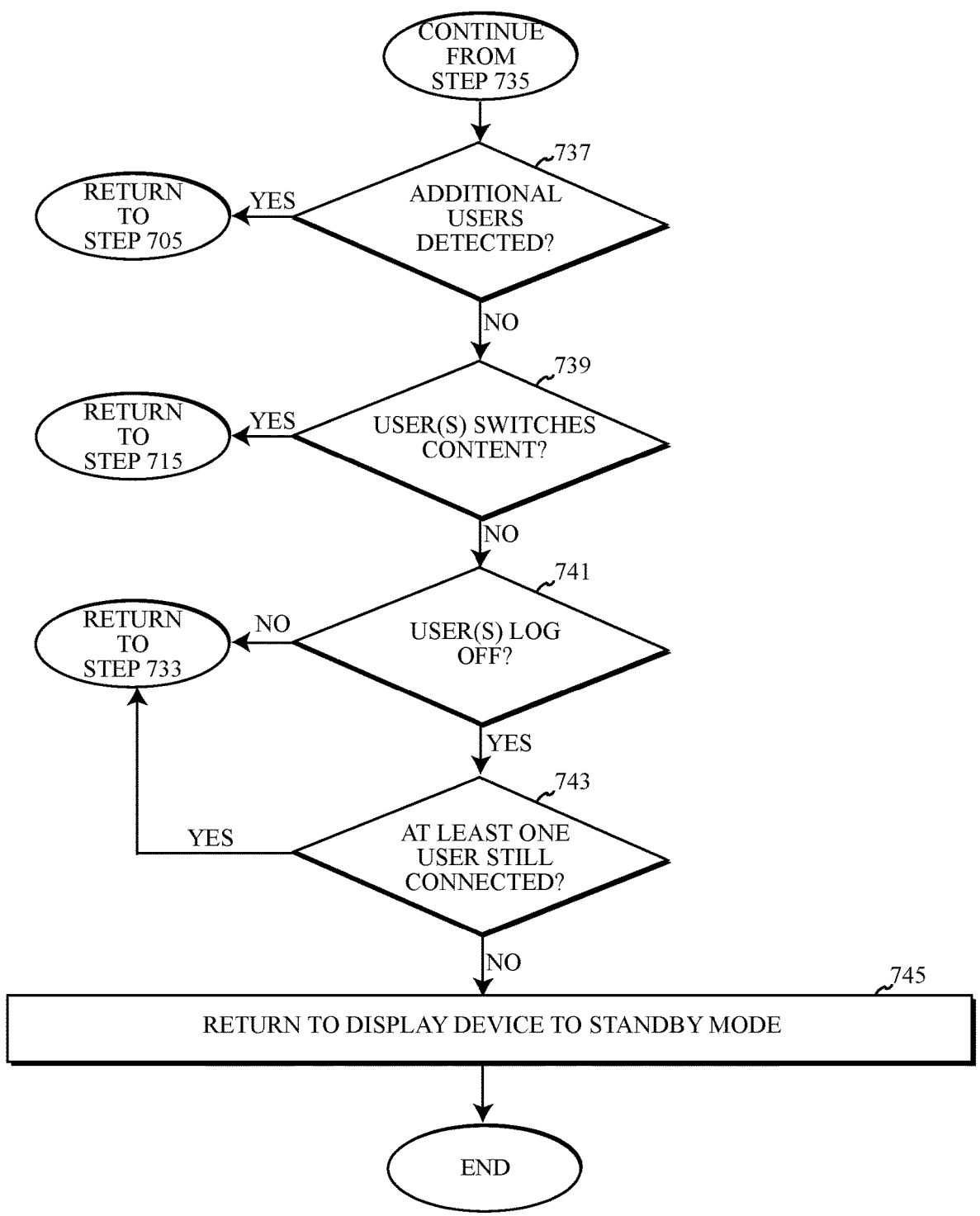
FIG. 7c is a continuation of the method steps describing the embodiment of the method from FIG. 7b.

Method for Managing Transmission and Display of Content from Multiple Content Sources The drawing of FIG. 7a-7c represents an embodiment of an algorithm 700 performing a computer-implemented method for managing the transmission and simultaneous display of a plurality of content sources 209 accessed by a plurality of users 501 viewing one or more different content sources 209 on the same display device 118. The algorithm 700, as shown and described by FIG. 7a-7c, may use one or more computer systems, defined generically by data processing system 100 of FIG. 1, and more specifically by the embodiments of specialized data processing systems of computing environments 200, 220, 300, depicted in FIGS. 2a-6 and as described herein. A person skilled in the art should recognize that the steps of the algorithm 700 described in FIG. 7a-7c may be performed in a different order than presented. The algorithm 700 may not necessarily require all the steps described herein to be performed. Rather, some embodiments of algorithm 700 may alter the methods by performing a subset of steps using one or more of the steps discussed below.

Embodiments of the algorithm 700 may begin at step 701. In step 701, display device 118 may be placed into a standby mode, such as a low power state while awaiting one or more users 501 to access the display device 118. In other embodiments, standby mode may display customized wallpaper, photos, screen savers or a black screen. For example, while in standby mode, the display device 118 may display artwork to resemble a framed picture or piece of artwork, in such a manner that the display device 118 may not be recognized as a display device 118 to unknowing onlooker passing by. Embodiments of the display device 118 may be actively searching as attempting to detect new users in the viewable area surrounding the display device 118. For example, by scanning the surrounding area using a recording device 206, detecting a presence of users 501 via a sensor device 204, or by connecting to a A/V receiver 207 that may be switched on or paired with the display device 118, indicating a user is attempting to access the DMSE interface 205. In step 703, the algorithm 700 determines whether or not a new user is detected. If a new user is not detected, the algorithm may return to step 701, remain in standby mode and continue to scan for new users entering the viewing area of display device 118. If, in step 703, a new user is detected, the algorithm may proceed to step 705.

In step 705 of algorithm 700, the display device 118 and/or A/V receiver 207 communicating with DMSE interface 205 may be presented login options to access DMSE 201. The login options may be presented to the user 501 on the display device 118 or through a A/V receiver 207. For example, a user 501 viewing a login screen on the DMSE interface 205 may be prompted to provide login credentials, such as a username/password, input biometric data such as a fingerprint, voice pattern, facial data or other data for identifying the user 501. The login credentials may be matched to login credentials stored by database 221. If the user has not registered with DMSE 201, the user may create new login credentials by registering with the DMSE 201. For example, the user 501 can create a user profile 228, select a username/password and/or provide biometric data to match to the user during subsequent login attempts to access DMSE 201. In step 707, the DMSE 201 may verify login information and/or biometric data as valid against the registered users stored in database 221. If the login credentials provided do not match the login credentials stored by database 221, or no login credentials for the user are found, the algorithm may proceed to step 709, wherein an error message may be displayed and the DMSE interface 205 may return the user to a login screen presented in step 705. Conversely, if the login credentials are validated and matched to a user 501, the algorithm may proceed to step 711.

In step 711, the embodiments of DMSE 201 may load user profile 228, settings 233, rules 227 and other preferred preferences of the user 501 logging into DMSE 201. The user profile 228, settings 223, rule 227 and other customized options associated with the user login may be applied to the DMSE interface 205 and/or A/V receiver 207. In step 713, the algorithm 700 may determine which content sources 209 are available for the user view and listen. For example, based on the content sources 209 connected to network 250, connected to an input of the display device 118 and/or accessible based on the user's ongoing subscriptions or past purchases. Embodiments of DMSE 201 may identify a process ID applied each of the available content sources 209. If a content source 209 has not been assigned a process ID, processor container 213 of the DMSE 201 may assign a process ID to the content source(s) 209.

Based on the content sources 209 available to the user 501 over the network 250 and/or connected to one or more display inputs of the display device 118, one or more content sources 209 may be presented to the user 501 for selection. The available options may be displayed on DMSE interface 205 and viewed by the user 501 via the display device 118 and/or through the A/V receiver 207 in step 715. User 501 may input a selection of the content source 209 for viewing or listening into the DMSE interface 205. The selection may be transmitted through the DMSE interface 205 as a request which may be received and managed by the processor container 213. Based on the user's 501 selection of the content source 209, DMSE 201 may identify the process ID associated with the selected content source 209 and in step 717 determine whether the process ID associated with the content source 209, is running as a background process of DMSE 201. If the process ID associated with the selected content source 209 is not running as a background process, the algorithm 700 may proceed to step 719, wherein processor container 213 may establish a new background process with the assigned process ID. For example, service(s) or APIs associated with the content source 209 If, in step 717 a determination is made by DMSE 201 that a background process for the process ID exists, the algorithm 700 may proceed to step 721.

During step 721 of algorithm 700, the DMSE 201 may pull and extract audio and/or video frames from the content source 209 selected by the user in step 715. In step 723, the audio and/or video frames extracted from the content source 209 may be saved to the DMSE memory 210, (i.e. such as memory 105, cache 107 or persistent storage 106) allocated to the process ID as data 211. For example, if the content source 209 is a live broadcast of a television channel or a data stream of a streaming service, the audio and/or video frames extracted from the content source's 209 transmission may be stored to the DMSE memory 210 in real time as the live broadcast or the data from the streaming service is transmitted. In step 725, the audio and/or video frames of the content source 209 stored to the DMSE memory 210 may be trimmed and processed for transmission to display device 118 and/or A/V receiver 207 associated with the user 501 over a frequency connection established between the DMSE 201 and the recipient display device 118 or A/V receiver 207.

In step 727, a determination is made whether the DMSE 201 is synchronized with the display device 118 and/or A/V receiver 207. If the DMSE 201 is synchronized with the device configured to receive the transmission of audio and/or video frames of the content source 209 saved to the DMSE memory 210, the algorithm 700 may proceed to step 733, wherein the DMSE 201 transmits the audio and/or video frames stored to the DMSE memory 210 of the process ID to the user's A/V receiver 207 over a frequency connection at the frequency or frequency band assigned to the process ID. Conversely, if the DMSE 201 has not been determined in step 727 to be synchronized with the A/V receiver 207, the algorithm 700, may proceed to step 729. In step 729, a determination is made whether a frequency has been assigned to the process ID scheduled to be transmitted to the A/V receiver 207 receiving the audio and/or video frames stored to the DMSE memory 210. If a frequency (or frequency band) has not been assigned, the algorithm proceeds to step 731, wherein the processor container 213 may assign the process ID an unused frequency or frequency band. Likewise, if a frequency has already been assigned to the process ID, DMSE 201 may connect to the target A/V receiver 207 by establishing a frequency connection at the assigned frequency and proceed to transmit the video and/or audio frames stored to the DMSE memory 210 for the process ID, as described above for step 733.

In step 735 of algorithm 700, the frames of the content stored to the DMSE memory 210 allocated to the process ID are received by the A/V receiver 207 and exhibited to the user 501. In some embodiments, the frames may be transmitted to the display device 118 and the display device may transmit the frames to the connected A/V receiver 207 synchronized to the display device. As discussed above, the exhibition of the audio and/or video frames may vary depending on the properties of the A/V receiver 207 receiving the frames and/or the operating mode of the A/V receiver 207. For example, an A/V receiver 207 operating in an A/R mode of operation may allow the user to view the exhibited frames presented in step 735 by viewing the display device 118 through a lens of the A/V receiver 207 which emulates the frames by overlaying the frames onto the display device 118 and/or displaying the emulated frames in physical space. Likewise, for the A/V receiver operating in a VR mode of operation, the frames being exhibited during step 735 may be displayed and emulated as part of a virtual environment, which may include a virtualized version of the display device 119 and a virtualized surrounding environment. Whereas in a mixed reality operation mode physical objects such as display device 118 may be observable within a virtualized environment and the content of the frames may be displayed within the virtual environment. For instance, by overlaying or emulating the frames of the process ID onto the display device 118.

In step 737, the algorithm 700 may determine whether or not additional user(s) 501 are present within the surrounding area of the display device 118. If a determination is made that additional users are detected, the algorithm 700 may return to step 705 and present each of the additional users 501 with login options for accessing DMSE 201 through the DMSE interface 205, as discussed above. If, no new users are detected in step 737, the algorithm 700 may further determine whether or not one or more users connected to DMSE 201 have selected to switch content sources 209. For any users that may have selected to switch content sources 209, the algorithm 700 may return to step 715, wherein the processor container 213 of DMSE 201 receives the user selection of the content source selected.

If, the determination is made in step 739, that one or more connected users have not switched content sources 209, the algorithm 700 may proceed to step 741, wherein the algorithm 700 may determine whether or not one or more users 501 have logged off and/or removed themselves from the surrounding area of the display device 118. For each user 501 that has not logged off and continues to view the same content source 209, the algorithm 700 returns to step 733 and continues to transmit audio and/or video frames associated with the process ID of the content source 209 selected by the user 501. However, if a user has been determined to log off in step 741, the algorithm may proceed to step 743, wherein the DMSE 201 further determines whether at least one user is still connected to the DMSE 201 for the display device 118. So long as at least one user 501 is connected, the algorithm returns to step 733 and continues to transmit the audio and/or video frames as described above. Conversely, if in step 743 no users remain connected to DMSE 201 via display device 118, the algorithm 700 proceeds to step 745, whereby the display device 118 may return to standby mode and scan for the presence of one or more users 501 entering the surrounding area of the display device 118.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, said method comprising:
    detecting, by a processor, a presence of a first user;
    presenting to the first user, by the processor, a plurality of content sources available for selection;
    receiving, by the processor, a selection of a first content source by the first user;
    establishing, by the processor, a background process, assigned with a first process ID;
    saving, by the processor, first video frames of the first content source to memory allocated to the first process ID;
    trimming, by the processor, the first video frames stored to the memory allocated to the first process ID;
    assigning, by the processor, a first transmission frequency to the first process ID;

transmitting, by the processor, the first video frames at the first transmission frequency to a first receiving device of the first user;
outputting, by the processor, the first video frames at the first transmission frequency to a display device, wherein the first video frames are viewable by the first user through the first receiving device;
detecting, by the processor, a presence of a second user;
presenting to the second user, by the processor, the plurality of content sources available for selection;
receiving, by the processor, a selection of a second content source by the second user;
saving, by the processor, second video frames of the second content source to memory allocated to a second process ID;
assigning, by the processor, a second transmission frequency to the second process ID, wherein the second transmission frequency is different from the first transmission frequency;
transmitting, by the processor, the second video frames at the second transmission frequency to a second receiving device of the second user; and
outputting, by the processor, the second video frames at the second transmission frequency to the display device simultaneous with said outputting the first video frames to the display device, wherein the second video frames are viewable by the second user through the second receiving device.

2. The computer-implemented method of claim 1, wherein detecting the presence of the first user further comprises:
receiving, by the processor, input from a recording device or a sensor device identifying the first user.

3. The computer-implemented of claim 2, wherein the recording device is a biometric camera recognizing the first user via facial recognition and the sensor device is a biometric sensor identifying the first user via fingerprint identification.

4. The computer-implemented method of claim 2, further comprising:
in response to identifying the first user, loading, by the processor, a user profile associated with the first user, wherein the user profile comprises one or more features selected from the group consisting of user preferences, settings, rules, available content sources and a combination thereof.

5. The computer-implemented method of claim 1, wherein the first receiving device is selected from the group consisting of smart glasses and a virtual reality headset.

6. The computer-implemented method of claim 1, wherein the step of transmitting the video frames of the first process ID at the first transmission frequency is performed over a network connection selected from the group consisting of a 5G wireless connection, and a Wi-Fi 6 wireless connection.

7. The computer-implemented method of claim 1, wherein the first receiving device is an augmented reality device that superimposes a computer-generated image on the first user's view of the real world, which provides to the first user a composite view of both physical space and virtual space.

8. A computer system comprising: a processor; and a computer-readable storage media coupled to the processor, wherein the computer-readable storage media contains program instructions executing a computer-implemented method, said method comprising:
detecting, by the processor, a presence of a first user;
presenting to the first user, by the processor, a plurality of content sources available for selection;
receiving, by the processor, a selection of a first content source by the first user;
establishing, by the processor, a background process, assigned with a first process ID;
saving, by the processor, first video frames of the first content source to memory allocated to the first process ID;
trimming, by the processor, the first video frames stored to the memory allocated to the first process ID;
assigning, by the processor, a first transmission frequency to the first process ID;
transmitting, by the processor, the first video frames at the first transmission frequency to a first receiving device of the first user;
outputting, by the processor, the first video frames at the first transmission frequency to a display device, wherein the first video frames are viewable by the first user through the first receiving device;
detecting, by the processor, a presence of a second user;
presenting to the second user, by the processor, the plurality of content sources available for selection;
receiving, by the processor, a selection of a second content source by the second user;
saving, by the processor, second video frames of the second content source to memory allocated to a second process ID;
assigning, by the processor, a second transmission frequency to the second process ID, wherein the second transmission frequency is different from the first transmission frequency;
transmitting, by the processor, the second video frames at the second transmission frequency to a second receiving device of the second user; and
outputting, by the processor, the second video frames at the second transmission frequency to the display device simultaneous with said outputting the first video frames to the display device, wherein the second video frames are viewable by the second user through the second receiving device.

9. The computer system of claim 8, wherein detecting the presence of the first user further comprises:
receiving, by the processor, input from a recording device or a sensor device identifying the first user.

10. The computer system of claim 9, wherein the recording device is a biometric camera recognizing the first user via facial recognition and the sensor device is a biometric sensor identifying the first user via fingerprint identification.

11. The computer system of claim 9, further comprising:
in response to identifying the first user, loading, by the processor, a user profile associated with the first user, wherein the user profile comprises one or more features selected from the group consisting of user preferences, settings, rules, available content sources and a combination thereof.

12. The computer system of claim 8, wherein the first receiving device is selected from the group consisting of smart glasses and a virtual reality headset.

13. The computer system of claim 8, wherein said transmitting the video frames of the first process ID at the first transmission frequency is performed over a network connection selected from the group consisting of a 5G wireless connection, and a Wi-Fi 6 wireless connection.

14. The computer system of claim 8, wherein the first receiving device is an augmented reality device that superimposes a computer-generated image on the first user's view of the real world, which provides to the first user a composite view of both physical space and virtual space.

15. A computer program product comprising: one or more computer-readable storage media having computer-readable program instructions stored on the one or more computer-readable storage media, said program instructions executing a computer-implemented method, said method comprising:
   detecting, by the processor, a presence of a first user;
   presenting to the first user, by the processor, a plurality of content sources available for selection;
   receiving, by the processor, a selection of a first content source by the first user;
   saving, by the processor, first video frames of the first content source to memory allocated to a first process ID;
   trimming, by the processor, the first video frames stored to the memory allocated to the first process ID;
   assigning, by the processor, a first transmission frequency to the first process ID;
   transmitting, by the processor, the first video frames at the first transmission frequency to a first receiving device of the first user;
   outputting, by the processor, the first video frames at the first transmission frequency to a display device, wherein the first video frames are viewable by the first user through the first receiving device;
   detecting, by the processor, a presence of a second user;
   presenting to the second user, by the processor, the plurality of content sources available for selection;
   receiving, by the processor, a selection of a second content source by the second user;
   saving, by the processor, second video frames of the second content source to memory allocated to a second process ID;
   assigning, by the processor, a second transmission frequency to the second process ID, wherein the second transmission frequency is different from the first transmission frequency;
   transmitting, by the processor, the second video frames at the second transmission frequency to a second receiving device of the second user; and
   outputting, by the processor, the second video frames at the second transmission frequency to the display device simultaneous with said outputting the first video frames to the display device, wherein the second video frames are viewable by the second user through the second receiving device.

16. The computer program product of claim 15, wherein detecting the presence of the first user and the second user further comprises:
   receiving, by a processor, input from a recording device or a sensor device identifies and differentiates the first user and the second user.

17. The computer program product of claim 16, wherein the recording device is a biometric camera recognizing the first user or second user via facial recognition and the sensor device is a biometric sensor identifying the first user or second user via fingerprint identification.

18. The computer program product of claim 16, further comprising:
   in response to identifying the first user, loading, by the processor, a first user profile associated with the first user;
   in response to identifying the second user, loading, by the processor, a second user profile associated with the second user; and
   wherein the first user profile and the second user profile comprise one or more features selected from the group consisting of user preferences, settings, rules, available content sources and a combination thereof.

19. The computer program product of claim 15, wherein the first receiving device is selected from the group consisting of smart glasses and a virtual reality headset.

20. The computer program product of claim 15, wherein said transmitting the video frames of the first process ID at the first transmission frequency or the audio or video frames of the second process ID at the second transmission frequency is performed over a network connection selected from the group consisting of a 5G wireless connection, and a Wi-Fi 6 wireless connection.

* * * * *